United States Patent

Saito

[11] Patent Number: 6,104,438
[45] Date of Patent: Aug. 15, 2000

[54] IMAGE SYNTHESIZER AND IMAGE SYNTHESIZING METHOD FOR SYNTHESIZING ACCORDING TO MOVEMENT

[75] Inventor: Etsuro Saito, Kanagawa, Japan

[73] Assignee: Sony Corporation, Tokyo, Japan

[21] Appl. No.: 09/051,001

[22] PCT Filed: Dec. 26, 1997

[86] PCT No.: PCT/JP97/04896

§ 371 Date: Mar. 31, 1998

§ 102(e) Date: Mar. 31, 1998

[87] PCT Pub. No.: WO98/30029

PCT Pub. Date: Jul. 9, 1998

[30] Foreign Application Priority Data

Dec. 26, 1996 [JP] Japan ................................. 8-346823

[51] Int. Cl.[7] ...................................................... H04N 9/75
[52] U.S. Cl. ........................... 348/587; 348/592; 348/239
[58] Field of Search ................................... 348/584, 586, 348/587, 591, 592, 239; H04N 9/75, 5/262

[56] References Cited

U.S. PATENT DOCUMENTS

| | | | |
|---|---|---|---|
| 4,409,618 | 10/1983 | Inaba ........................................ | 348/587 |
| 4,628,363 | 12/1986 | Kashiwa ................................... | 348/587 |
| 4,951,040 | 8/1990 | McNeil et al. . | |
| 5,056,928 | 10/1991 | Aoki et al. . | |
| 5,886,747 | 3/1999 | Tzidon .................................... | 348/587 |

FOREIGN PATENT DOCUMENTS

| | | |
|---|---|---|
| 63-271664 | 11/1988 | Japan . |
| 2-199971 | 8/1990 | Japan . |
| 2-292986 | 12/1990 | Japan . |
| 2-306782 | 12/1990 | Japan . |
| 3-42788 | 9/1991 | Japan . |
| 5-207502 | 8/1993 | Japan . |
| 6-105232 | 4/1994 | Japan . |
| 7-500470 | 1/1995 | Japan . |

*Primary Examiner*—Sherrie Hsia
*Attorney, Agent, or Firm*—Frommer Lawrence & Haug, LLP.; William S. Frommer; Dexter T. Chang

[57] ABSTRACT

An image synthesizer for detecting an area photographs a processing object area having a predetermined hue from video data obtained through a video camera, inserts another image in the area, and then produces a synthesized image. The image synthesizer forms on the processing object area a light source image having the same hue as the processing object area, detects position information of the video camera with respect to the processing object area with the light source image as a reference, and changes the other image in correspondence with position change of the video camera with the position information as a reference. In this way, the position of the video camera is detected with the light source image as a reference, and image which is inserted is changed according to a position change of the video camera. Therefore, when the video camera is moved, an image which is inserted is also changed according to the movement, and consequently, an image with no feeling of physical disorder is obtainable.

25 Claims, 16 Drawing Sheets

|  | P11 | P21 | P31 | P41 | ... | Pnn |
|---|---|---|---|---|---|---|
| FIRST FRAME | 0 | 1 | 0 | 1 |  | 0 |
| SECOND FRAME | 0 | 1 | 1 | 0 |  | 1 |
| THIRD FRAME | 1 | 0 | 1 | 1 |  | 0 |
| FOURTH FRAME | 0 | 1 | 0 | 1 |  | 1 |
| FIFTH FRAME | 1 | 0 | 1 | 1 |  | 0 |

IMAGE SYNTHESIZER AND IMAGE SYNTHESIZING METHOD FOR SYNTHESIZING ACCORDING TO MOVEMENT

TECHNICAL FIELD

The present invention relates to image synthesizers and is suitably applicable, for example, in the case where an image by a live camera and an image by computer graphics are synthesized together in real time, by employing a chromakey technique, in a broadcasting studio and the like.

BACKGROUND ART

Hitherto, in broadcasting studios, a live image photographed with a live camera and a computer graphic image produced by a computer have been synthesized together by employing a chromakey technique, and the resultant synthesized image has been broadcasted.

For example, when producing with a chromakey technique an image such that a person is present in virtual space produced by computer graphics, a person is caused to stand in front of background with a predetermined hue (e.g., colors which are not contained in the image of a person, such as blue and green), and the person is photographed. Then, a key signal is produced from the video signal with the hue of the background as a reference, and based on the key signal, the background is replaced with an image produced by computer graphics. This makes it possible to synthesize a computer graphic image and a person together and produce such an image as if the person is present in virtual space produced by computer graphics.

Incidentally, in such a conventional image synthesizer employing a chromakey technique, when the camera is moved, there is the disadvantage that the synthesized background (i.e., an image produced by computer graphics in the aforementioned example) does not change in correspondence with the movement of the camera. If image synthesis can be performed so that the image of a synthesized background is also changed naturally in correspondence with such movement of the camera, it is believed that an image synthesized by this kind of image synthesis can be made even more realistic.

DISCLOSURE OF THE INVENTION

The present invention has been made in view of the aforementioned points, and it is an object of the present invention to provide an image synthesizer in which an image of background which is synthesized can also be changed naturally in correspondence with movement of a photographing means, with simple constitution.

In the present invention for overcoming such problems, in an image synthesizer for detecting an area photographing a processing object area having a predetermined hue from video data obtained through photographing means, inserting another image in the area, and then producing a synthesized image, the synthesizer is provided with illumination means for forming on the processing object area a light source image having the same hue as the processing object area, position detection means for detecting position information of the photographing means with respect to the processing object area with the light source images as a reference, and image production means for changing the other image in correspondence with position change of the photographing means with the position information as a reference.

In this way, the position of the photographing means with respect to the processing object area is detected with the light source image as a reference, and another image which is inserted according to a change in the detected position of the photographing means is changed. Therefore, when the photographing means is moved, an image which is inserted is also changed according to the movement, and consequently, a synthesized image with no feeling of physical disorder is obtainable. If done in this way, an image synthesizer in which an image of background which is synthesized can also be changed naturally in correspondence with movement of a photographing means can be realized with simple constitution.

In addition, in the present invention, in an image synthesizer for detecting an area photographing a processing object area having a predetermined hue from input video data, inserting another image in the area, and then producing a synthesized image, the image synthesizer is provided with: illumination means for forming on the processing object area a plurality of light source images having the same hue as the processing object area, when producing the input video data; position detection means for detecting the processing object area from the input video data and detecting positions of four light source images of the plurality of light source images formed on the processing object area which become references; image conversion means for three-dimensionally image-converting background source video data which is inserted in the processing object area, based on position information of the light source images detected by the position detection means; and synthesis means for synthesizing the background source video data image-converted by the image conversion means with an area of the input video data corresponding to the processing object area.

In this way, the position information of four light source images which become references is detected, and the background source video data which is inserted is three-dimensionally image-converted based on the position information. Therefore, if only four light source images are detected, even when the photographing means is moved, background source video data which changes according to the movement can be produced, and consequently, an image compatible with no feeling of physical disorder is obtainable. If done in this way, an image synthesizer in which an image of background which is synthesized can also be changed naturally in correspondence with movement of a photographing means can be realized with even simpler constitution.

BRIEF DESCRIPTION OF THE DRAWINGS

FIG. 15 is a schematic diagram used for a description of the detection of reference point light sources;

BEST MODE FOR CARRYING OUT THE INVENTION

Figure 1:
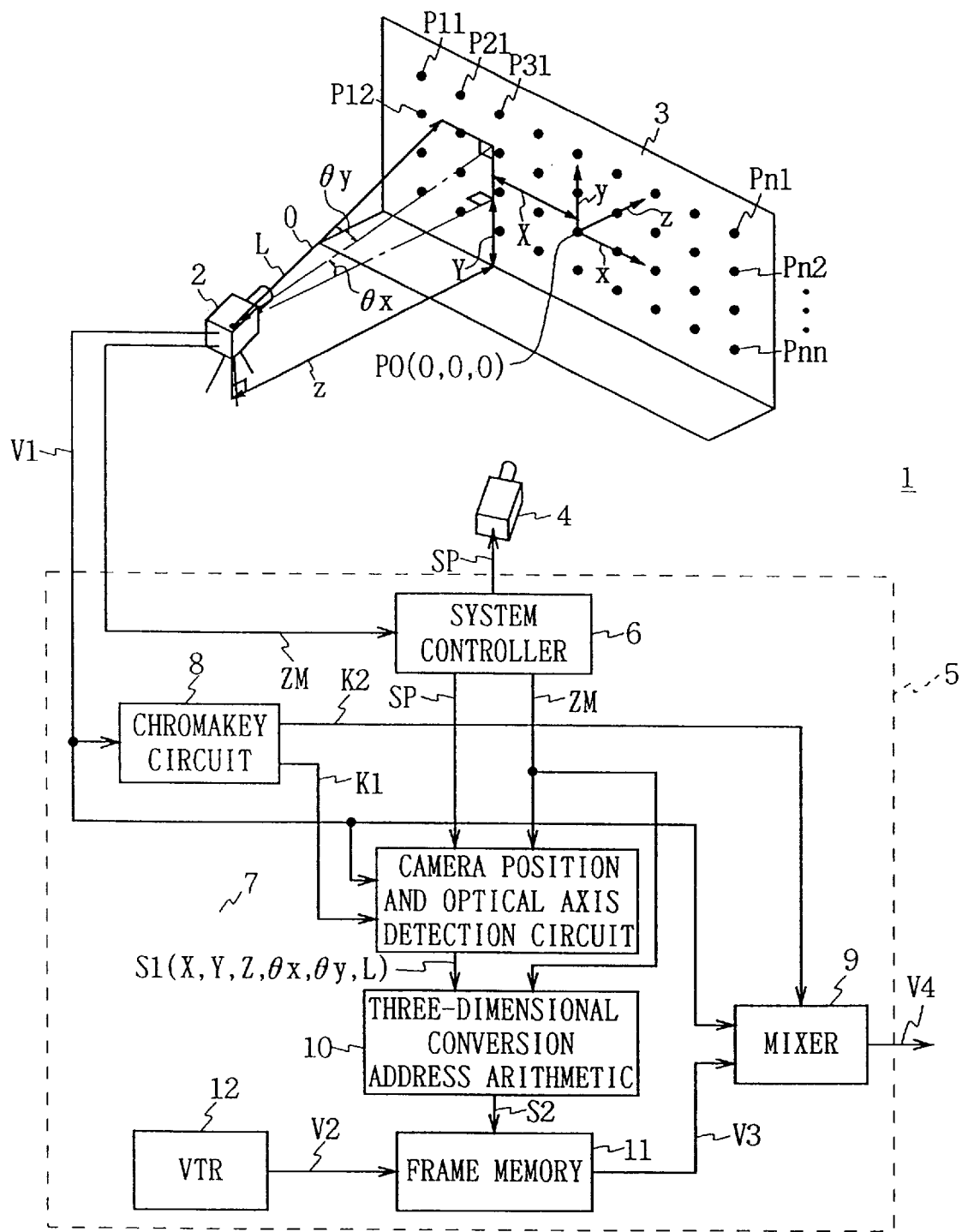
FIG. 1 is a block diagram showing the constitution of an image synthesizer according to a first embodiment.

Embodiments of the present invention will hereinafter be described with reference to the drawings.
(1) First Embodiment
(1-1) Overall constitution of an image synthesizer:

In FIG. 1, reference numeral 1 generally denotes an image synthesizer according to a first embodiment, which is roughly constituted by a video camera 2 for photographing a subject such as a person, a projector unit 4 for projecting point light sources onto a background plate 3 which becomes the background of a subject, and an image processing section 5 for producing a synthesized image from a video signal V1 photographed by the video camera 2.

This image synthesizer 1 photographs an announcer standing in front of the background plate 3 along with the background plate 3, and synthesizes, for example, an image of virtual space produced with computer graphics and an image of a scene photographed at another place together at the place of the background plate 3, thereby producing such a synthesized image as though the announcer is really present in virtual space or at another place other than a studio.

The background plate 3 that is used in this image synthesizer 1 is dyed a single color (e.g., blue or green) that a subject such as an announcer standing in front of the background 3 does not have, whereby the subject and the background can be identified by colors.

The projector unit 4 is a unit for projecting onto the background plate 3 a plurality of point light sources P11 through Pnn formed in matrix form at intervals of a predetermined pitch in horizontal and vertical directions. In this case the light color of the point light sources P11 through Pnn is set to the same hue as the background plate 3, for example, to blue or green. Note that among a plurality of point light sources P11 through Pnn, the point light source P0 which is projected onto approximately the center of the background plate 3 is set to a reference point light source.

In this image synthesizer 1, the position of this reference point light source P0 is set to the origin of three-dimensional space, and a three-dimensional coordinate system is defined with the horizontal direction to the reference point light source P0 as an x axis, the vertical direction as a y axis, and the depth direction as a z axis. The position of the video camera 2 is detected according to this three-dimensional coordinate system. In addition, in this image synthesizer 1 an image which is synthesized with background is deformed based on the detected position of the video camera 2, whereby the background image also changes naturally in correspondence with movement of the video camera 2.

Figures 2, 13:
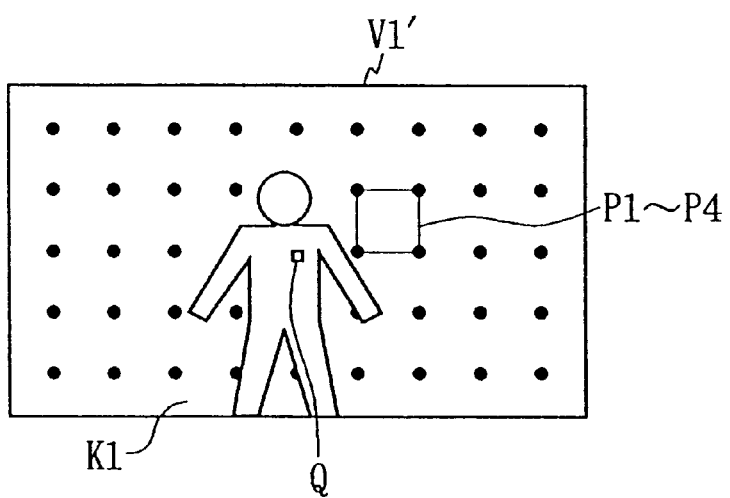
FIG. 2 is a diagram used for a description of identification codes for point light sources.
FIG. 13 is a schematic diagram used for a description of the detection of point light sources.

In the projector unit 4, when the point light sources P11 through Pnn are projected, the point light sources P11 through Pnn are turned on and off in synchronization with the frame timing of the video camera 2. At this time, assume that light-on and light-off are expressed by a 1 and a 0. As shown in FIG. 2, the point light sources P11 through Pnn are not turned on or off at a time but are turned on or off so that they differ for each point light source with five frames as a cycle, whereby the point light sources P11 through Pnn can be identified by the manner in which a point light source is turned on and off. For example, if a point light source performs light-off→light-off→light-on→light-off→light-on for five frames, as shown in FIG. 2, it can be identified as point light source P11.

To project the point light sources P11 through Pnn which are turned on and off in this way, the system controller 6 of the image processing section 5 supplies the projector unit 4 with a reference pulse signal SP whose signal level rises at the timing of the first frame. Therefore, based on this reference pulse signal SP, the projector unit 4 turns on and off the point light sources P11 through Pnn independently of each other with five frames as a cycle, as shown in FIG. 2. Note that the manner in which a point light source is turned on and off, shown in FIG. 2, represents information for identification, so this manner is referred to in the following description as an identification code.

Incidentally, a camera position and optical axis detection circuit 7 to be described later grasps this identification code previously stored in memory, because it detects the reference point light source P0 with the manner in which a point light source is turned on and off. Since the camera position and optical axis detection circuit 7 needs to know the start of the five-frame cycle when detecting the reference point light source P0, the camera position and optical axis detection circuit 7 is also supplied with the reference pulse signal SP by the system controller 6.

Here, in this image synthesizer 1 the video signal V1 consisting of a person and background, photographed with the video camera 2, is output to a chromakey circuit 8 and a mixer circuit 9 of the image processing section 5. Also, the video camera 2 outputs the information of magnification with which a subject was photographed, as zoom information ZM to the system controller 6 of the image processing section 5.

The system controller 6 of the image processing section 5 is control means for controlling operation of this image synthesizer 1. As described above, the system controller 6 sends out a reference pulse signal SP to the projector unit 4 and also sends out the reference pulse signal SP to the camera position and optical axis detection circuit 7 along with zoom information ZM. Note that the system controller 6 outputs the zoom information ZM to a three-dimensional conversion address arithmetic circuit 10 to be described later, as well.

On the other hand, the chromakey circuit 8 supplied with a video signal V1 extracts a color signal corresponding to the hue of the background plate 3 from the video signal V1 and compares the color signal with a predetermined threshold value, thereby producing a key signal K1 which represents the background portion in the video signal V1 and then outputting the key signal K1 to the camera position and optical axis detection circuit 7. Also, the chromakey circuit 8 inverts the key signal K1, thereby producing a key signal K2 which represents the person portion in the video signal V1 and then outputting the key signal K2 to the mixer circuit 9.

Figure 3:
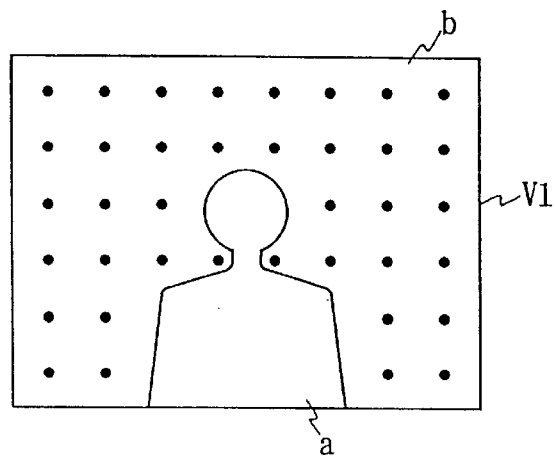
FIG. 3 is a schematic diagram used for a description of key signals K1 and K2.
Figure 3:
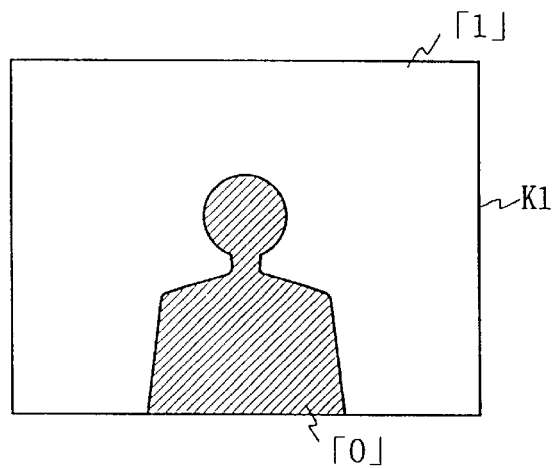
Figure 3:
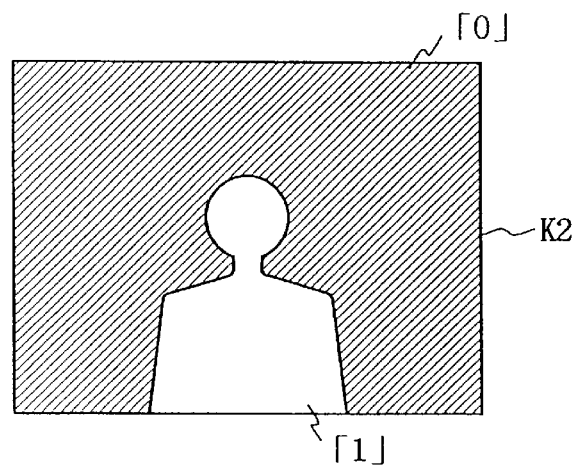

Here, the image diagrams of the video signal V1 and the key signals K1 and K2 are shown in FIGS. 3(A)–3(C). As shown in FIG. 3(A), since the video camera 2 photographs a person which becomes a subject along with the background plate 3, the video signal V1 contains the image portion (a) of the person and the image portion (b) of the background plate 3. In this case, from the fact that the background plate 3 has been set to a special color such as blue or green, if the color signal corresponding to the hue of the background plate 3 is extracted from the video signal V1 and compared with a threshold value, then the key signal K1 whose signal level goes, for example, to a 1 in the background portion (b) of the video signal V1 can be easily produced as shown in FIG. 3(B). In addition, if this key signal K1 is inverted, the key signal K2 whose signal level goes, for example, to a 1 in the person portion (a) of the video signal V1 can be easily produced as shown in FIG. 3(C).

The camera position and optical axis detection circuit 7 extracts from the video signal V1 an area where the signal level of the key signal K1 goes to a 1, thereby producing a video signal consisting only of a background portion. Then, the camera position and optical axis detection circuit 7 detects the positions of the point light sources P11 through Pnn from the video signal consisting only of a background portion, based on the identification code and reference pulse signal SP stored in the interior memory. Subsequently the camera position and optical axis detection circuit 7 extracts four point light sources adjacent to the central portion of the screen from among the detected point light sources P11 through Pnn. Based on the position of these four point light sources and zoom information ZM, the camera position and optical axis detection circuit 7 computes the vertical and horizontal inclinations of the optical axis O of the video camera 2 with respect to the background plate 3, that is, the angles $\theta_x$ and $\theta_y$ around the X axis and Y axis of a three-dimensional coordinate system, the distance L from the video camera 2 to the background plate 3, and the position of the camera 2 to the reference point light source P0 (i.e., the position coordinate (X, Y, Z) in a three-dimensional coordinate system with reference point light source P0 as origin). The information of these computed parameters is output to the three-dimensional conversion address arithmetic circuit 10 as detection data S1.

Based on this detection data S1 and the zoom information ZM which is supplied from the system control 6, the three-dimensional conversion address arithmetic circuit 10 generates a read address for three-dimensionally deforming in accordance with the position of the video camera 2 a background image which is synthesized, and outputs the read address S2 to frame memory 11. That is, since the three-dimensional conversion address arithmetic circuit 10 produces such an image as if a background image were seen from the position of the video camera 2, it produces a read address necessary for realizing such three-dimensional image conversion and outputs it to the frame memory 11.

A video tape recorder (VTR) 12 is loaded with video tape recorded with an image which is synthesized as a background image (e.g., an image produced with computer graphics or a scene image photographed at another place). The video tape recorder 12 plays the video tape back and thereby outputs a video signal (hereinafter referred to as a background source video signal) V2 of a background image which is used for synthesis. The background source video signal V2 is supplied to the aforementioned frame memory 11 and written in sequence to the storage area in the frame memory 11.

Based on the read address S2 supplied from the three-dimensional conversion address arithmetic circuit 10, the frame memory 11 sequentially reads out the background source video signals V2 written to the storage area, thereby producing a background source video signals V3 three-dimensionally deformed according to the position of the video camera 2 and outputting it to the mixer circuit 9. For example, as shown in FIG. 4(A), in the case where the background source video signal V2 is a video signal photographing a picture hung on the wall of an art museum and also the position of the video camera 2 is diagonally in front and left of the background plate 3, the frame memory 11 deforms the video signal V2 by a read process based on the read address S2 into such a video signal V3 as if the picture were photographed diagonally from the front and the left, as shown in FIG. 4(B).

Figure 5:
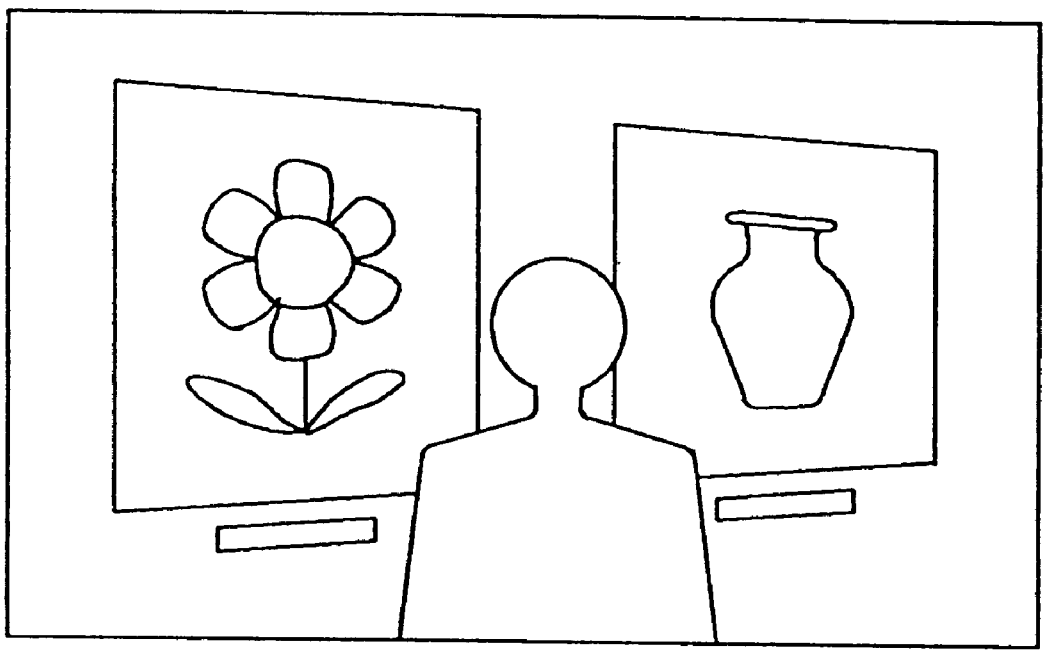
FIG. 5 is a video image diagram used for a description of a synthesized video signal that is produced by the image synthesizer.

The mixer circuit 9 selects the video signal V1 when the signal level of the key signal K2 is a 1 and selects the background source video signal V3 when the signal level of the key signal K2 is a 0, thereby synthesizing the video signal V1 and the background source video signal V3 together. This can produce such a video signal V4 as if an announcer present on a studio were in front of an art museum and also it were photographed from the front and the left, as shown in FIG. 5.

Note that the synthesizing process in the mixer circuit 9 is expressed by the following equation:

$$V4 = K2 \cdot V1 + (1-K2) \cdot V3 \qquad (1)$$

(1-2) Detection Algorithm of camera position and optical axis:

Subsequently in this paragraph, a description will be made of detection algorithm of camera position and optical axis.

Figure 6:
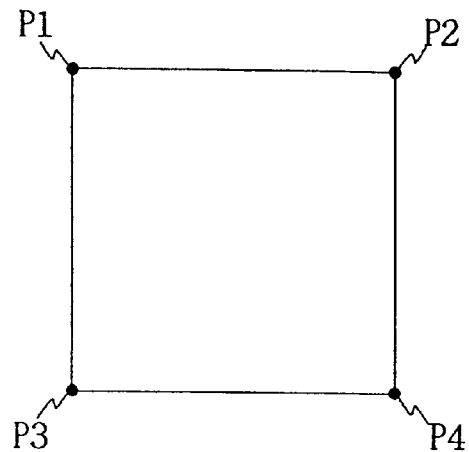
FIG. 6 is a block diagram used for a description of a method of detecting the position information (distance, inclination, and position) of a video camera according to the first embodiment.
Figure 7:
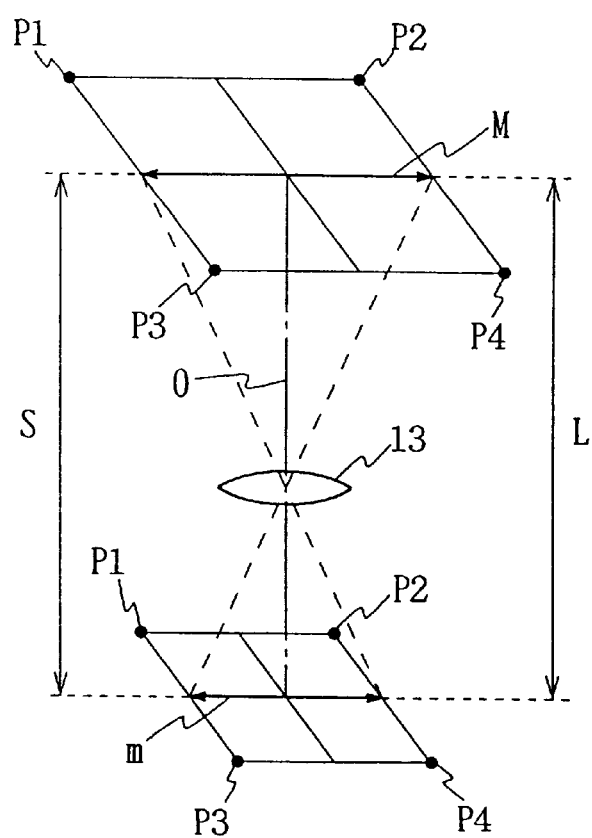
FIG. 7 is a block diagram used for a description of the method of detecting the position information (distance, inclination, and position) of a video camera according to the first embodiment.

As described above, when photographing the point light sources arranged in the form of a matrix on the background plate 3, if they are photographed in a direction perpendicular to the surface of the background plate 3, adjacent point light sources P1 through P4 will be photographed as a rectangular shape, as shown in FIG. 6. Therefore, as shown in FIG. 7, if the optical path length from the background plate 3 to the image photographing plane of the video camera 2 is taken to be S, then the following relational equation can be obtained between the space M between the point light sources P1 and P2 on the background plate 3 and the space m between the images of the point light sources P1 and P2 on the image photographing plane.

$$\frac{m}{M} = \frac{f}{S-f} \quad (2)$$

where f is the focal distance of the zoom lens 13 in the video camera 2.

Incidentally, the optical path length S from the background plate 3 to the image photographing plane of the video camera 2 nearly equals the distance L from the background plate 3 to the video camera 2 (distance to a point at which the optical axis O of the video camera 2 crosses the background plate 3). Therefore, deforming Equation (1) can obtain the following relational equation for the distance L from the background plate 3 to the video camera 2.

$$L = f \cdot \left(1 + \frac{M}{m}\right) \quad (3)$$

therefore, based on the distance m between four point light sources extracted from the video signal V1, the focal distance f obtained from the zoom information ZM of the zoom lens 13, and the distance M between point light sources arranged at intervals of a predetermined pitch, computation of Equation (3) is performed, whereby the distance L from the background plate 3 to the video camera 2 is obtainable.

Figure 8:
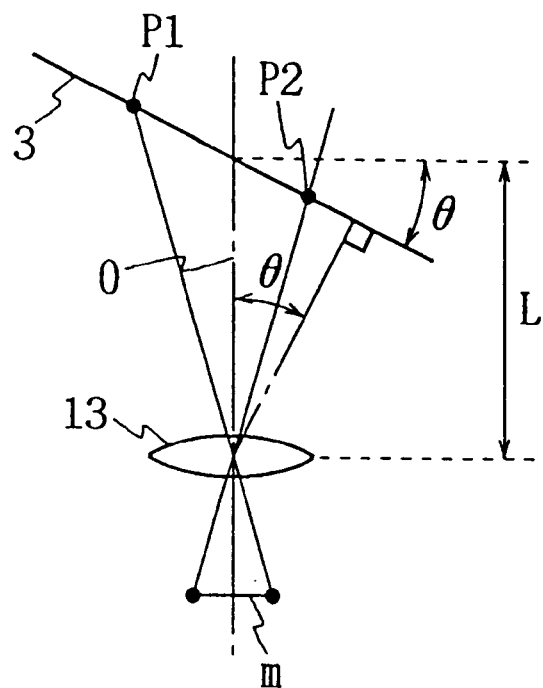
FIG. 8 is a block diagram used for a description of the method of detecting the position information (distance, inclination, and position) of a video camera according to the first embodiment.
Figure 9:
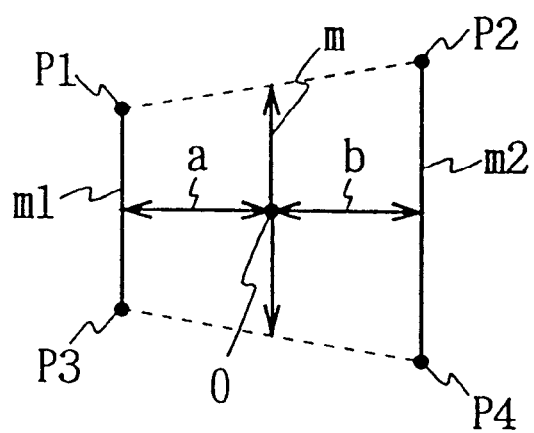
FIG. 9 is a block diagram used for a description of the method of detecting the position information (distance, inclination, and position) of a video camera according to the first embodiment.

On the other hand, as shown in FIG. 8, in the case where the video camera 2 inclines with respect to the background plate 3, the image of the video camera 2 is observed in the state in which the images of point light sources P1 through P4 have been deformed from a rectangular shape, as shown in FIG. 9. In this case, based on the point light source images of the four points forming a rectangular shape, the distance m1 between the images of the point light sources P1 and P3 continuous in a vertical direction and the distance m2 between the images of the point light sources P2 and P4 are first computed. Then, based on these values m1 and m2, the distance m between point light source images in the case where they are arranged so as to vertically cross the optical axis O of the video camera 2 is computed, and this distance m is computed by substituting it into Equation (3). This can make it possible to compute the distance L from the background plate 3 to the video camera 2 even in the case where the video camera 2 inclines with respect to the background plate 3.

Figure 10:
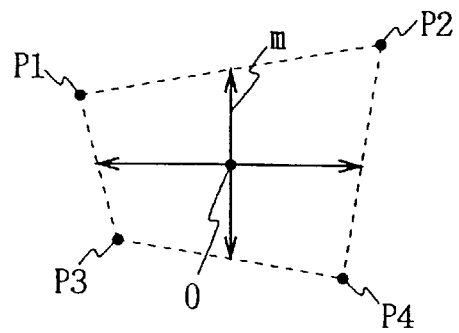
FIG. 10 is a block diagram used for a description of the method of detecting the position information (distance, inclination, and position) of a video camera according to the first embodiment.

Note that in the case where the optical axis O is present inside four point light source images which become references for distance computation with the coordinate values of the four images as references, the distance m can be computed by an interpolation arithmetic process which interpolates a straight line linking adjacent point light source images together, and in the case where the optical axis O is present outside the four points, the distance m can be computed by an extrapolation arithmetic process which extrapolates a straight line linking adjacent point light source images together. Also, in the case where the video camera 2 inclines in both a horizontal direction and a vertical direction, as shown in FIG. 10, the distance m between point light source images in the case where they are arranged so as to vertically cross the optical axis O is computed for a rectangular shape formed by these four points, whereby the distance L can be computed.

On the other hand, the horizontal inclination (y of the optical axis O can be represented by the following equation on the assumption that a horizontal space is interiorly divided a:b on the inner side of four point light source images by the optical axis O. Therefore, the horizontal inclination $\theta_y$ of the optical axis O can be computed by using Equation (4).

$$\theta_y = \arccos\left\{\frac{(a+b)}{a} \cdot \left(\frac{m}{m2} - 1\right)\right\} \quad (4)$$

Also, for the vertical inclination $\theta_x$ of the optical axis O, if the space between horizontal adjacent point light source images is substituted into Equation (4) instead of the space between vertical adjacent point light source images, the vertical inclination $\theta_x$ can be computed.

Figure 11:
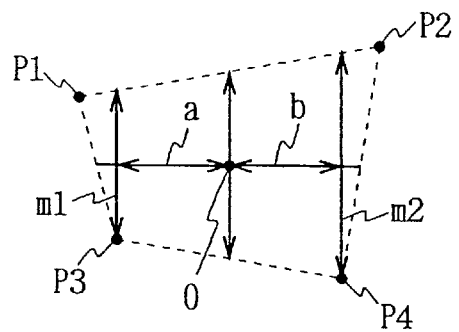
FIG. 11 is a block diagram used for a description of the method of detecting the position information (distance, inclination, and position) of a video camera according to the first embodiment.

Furthermore, in the case where the optical axis O inclines in both a horizontal direction and a vertical direction, as shown in FIG. 11, for a rectangular shape forming these four points, if vertical line segments m1 and m2 are detected with either point image as a reference and if the arithmetic process expressed by Equation (4) is executed based on the vertical line segments m1 and m2, then the horizontal inclination $\theta_y$ of the optical axis can be computed.

Figure 12:
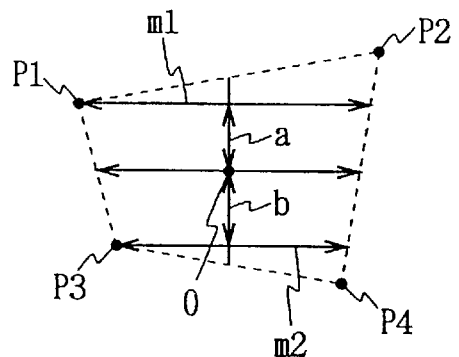
FIG. 12 is a block diagram used for a description of the method of detecting the position information (distance, inclination, and position) of a video camera according to the first embodiment.

Also, to the contrary, for the rectangular area forming these four points, if horizontal line segments m1 and m2 are detected with either point image as a reference and if the arithmetic process expressed by Equation (4) is executed based on the horizontal line segments m1 and m2, as shown in FIG. 12, then the vertical inclination $\theta_x$ of the optical axis can be computed. Furthermore, in the case where the optical axis O is present outside four points, if the arithmetic process expressed by Equation (4) is likewise executed for a rectangular area forming these four points, the horizontal and vertical inclinations $\theta_y$ and $\theta_x$ can be computed.

Based on such a parameter computation algorithm, the camera position and optical axis detection circuit 7 extracts the point light source images P1 through P4 of four points adjacent to a reference position Q corresponding to the optical axis O and also adjacent in horizontal and vertical directions, with this reference position Q as a reference, from the images V1' of point light sources extracted from the video signal V1, as shown in FIG. 13, and then detects the coordinate values of these point light source images P1 through P4.

At this time, the camera position and optical axis detection circuit 7 judges the point light images with the identification codes stored in the interior memory as references, and reliably detects the point light source images of four points adjacent in horizontal and vertical directions even when the point light sources are partially shut out, for example, by a person standing in front of the background plate 3.

Furthermore, if the point light source images of four points having been selected between continuous frames will no longer be able to be extracted due to movement of a person standing in front of the background plate 3 or movement of the video camera 2, other point light source images will be extracted as processing objects.

Moreover, in frames where any of detected four point light source images are allocated to lights-off, the camera position and optical axis detection circuit 7 extracts four point light source images adjacent on the background plate 3 for each frame, for example, by an interpolation arithmetic utilizing frames before and after, or by selecting other four point light source images as needed.

If four point light source images adjacent in horizontal and vertical directions on the background plate 3 are detected in this way, the camera position and optical axis detection circuit 7 will perform the aforementioned interpolation and extrapolation arithmetic processes with the reference position Q as a reference, by referring to the zoom information ZM obtained from the video camera 2, and will detect the distance L to a point at which the optical axis O of the video camera 2 crosses the background plate 3, and vertical and horizontal inclinations $\theta_x$ and $\theta_y$.

The camera position and optical axis detection circuit 7 further detects the coordinate values (i.e., three-dimensional coordinate with a reference point light source P0 as an origin) of these point light sources with respect to the reference point light source P0 from the identification codes for point light sources used for detection. From these coordinate values, the detected distance L, and the detected inclinations $\theta_x$ and $\theta_y$, the camera position and optical axis detection circuit 7 computes the coordinate value (X, Y, Z) of the video camera 2.

The camera position and optical axis detection circuit 7 repeats the coordinate value detecting process and the distance and inclination detecting process for each field in the video signal V1, and outputs the detection data S1 (X, Y, Z, $\theta_x$, $\theta_y$, and L) obtained as the result of the processes to the three-dimensional conversion address arithmetic circuit 10.

(1-3) Operation and advantageous effects:

In the aforementioned constitution, this image synthesizer 1 first drives the projector unit 4, thereby projecting point light sources P11 through Pnn onto the background plate 3 installed in the background of a person who becomes a subject to be photographed. At this time, the point light sources P11 through Pnn are turned on and off with a fixed pattern so that the point light sources P11 through Pnn can be identified later.

With the state in which the point light sources P11 through Pnn have been projected on the background plate 3 in this way, a person being a subject is photographed by the video camera 2, and the resultant video signal V1 is input to the image processing section 5. The zoom information ZM used in the photography of the video camera 2 is also input to the image processing section 5.

In the image processing section 5 the video signal V1 is first input to the chromakey circuit 8. The chromakey circuit 8 extracts a color signal corresponding to the hue of the background plate 3 from the video signal V1 and compares the color signal with a predetermined threshold value, thereby producing a key signal K1 representative of the background portion of the video signal V1 and also producing a key signal K2 representative of the subject portion of the video signal V1.

The camera position and optical axis detection circuit 7 first receives this key signal K1 and video signal V1 and, based on the key signal K1, produces a video signal consisting only of a background portion from the video signal V1. Then, the camera position and optical axis detection circuit 7 reads out an identification code consisting of the on-and-off information of a point light source stored in the interior memory and, based on the identification code and reference pulse signal SP, detects the positions of the point light sources P11 through Pnn from the video signal only consisting of a background portion. Subsequently, from among the detected point light sources P11 through Pnn, the camera position and optical axis detection circuit 7 extracts four point light sources most adjacent to the reference position Q on the display screen corresponding to the optical axis O of the video camera 2 and also adjacent in horizontal and vertical directions on the background plate 3. Then, based on the coordinate values of the extracted four point light sources and the zoom information ZM, the camera position and optical axis detection circuit 7 computes the distance L to a point at which the optical axis O of the video camera 2 crosses the background plate 3, the horizontal inclination $\theta_y$ of the optical axis O, and the vertical inclination $\theta_x$ of the optical axis O by performing computations of the aforementioned Equations (3) and (4).

In this way, the camera position and optical axis detection circuit 7 judges a point light source image with an identification code as a reference, whereby four point light source images necessary for computations of the distance L and the like can be reliably detected even when the point light sources are partially shut out, for example, by a person standing in front of the background plate 3.

In addition, when computing the distance L and the like, the distance L and inclinations (x and (y can be easily computed, by referring to the zoom information ZM obtained from the video camera 2 and performing the interpolation and extrapolation arithmetic processes with a reference position Q as a reference.

If the distance L and the inclinations $\theta_x$ and $\theta_y$ are computed in this way, the camera position and optical axis detection circuit 7 will compute the reference point light source P0, i.e., the position coordinate (X, Y, Z) of the video camera 2 with respect to the origin of a three-dimensional coordinate system, based on the positions of the point light source images used in detecting the distance L and the like.

Based on these parameters (X, Y, Z, $\theta_x$, $\theta_y$, and L) computed by the camera position and optical axis detection circuit 7 and the zoom information ZM supplied from the system controller 6, the three-dimensional conversion address arithmetic circuit 10 generates a three-dimensional conversion read address S2 for producing such an image as if a background image (V2) were seen from the position of the video camera 2.

Based on this read address S2, the frame memory 11 reads out the stored background source video signal V2, thereby producing such a background source video signal V3 as if the background image were seen from the position of the video camera 2. Therefore, if the background source video signal V3 and the video signal V1 are synthesized together based on the key signal K2, an image can be produced as if a person who is a subject were not present in a studio but were present in virtual space obtained by computer graphics or at another place.

In this case, a synthesized image with no feeling of physical disorder is obtainable because three-dimensional image conversion is performed as if the background source video signal V3 synthesized with background were seen from the position of the video camera 2. In addition, in this image synthesizer 1 the read addresses S2 are generated in sequence based on the detected position of the video camera 2, and based on the sequentially generated read signals S2, image conversion is performed on the background source video signal V2. Therefore, even if the position of the video camera 2 were moved, the background image would change according to the movement of the video camera 2 and therefore a more realistic synthesized image with no feeling of physical disorder could be obtained. Furthermore, in this image synthesizer 1 the zoom information ZM of the video camera 2 is also used in computing the read address S2, so even in the case where a person who becomes a subject is zoomed, the background image is also enlarged or reduced without a feeling of physical disorder in interlock with the enlargement or reduction of the person.

According to the aforementioned constitution, the position information of the video camera 2 is detected with the point light source images projected in matrix form on the background plate 3 as references, and with this position information as a reference, a visual point is set and a background image is synthesized, whereby the background image which is synthesized with background can be changed in correspondence with movement of the video camera 2. If done in this way, an image synthesizer 1 in which the image of background which is synthesized can also be changed naturally in correspondence with movement of a photographing means can be realized with simple constitution.

(2) Second Embodiment (2-1) Overall constitution of an image synthesizer:

In the aforementioned first embodiment, while it has been described that parameters for image conversion (i.e., read addresses in the frame memory) are computed from the geometric relation between the video camera 2 and the background plate 3, this second embodiment detects to which place reference point light sources have been moved on a monitor screen upon movement of the video camera 2, thereby computing parameters for image conversion.

Figure 14:
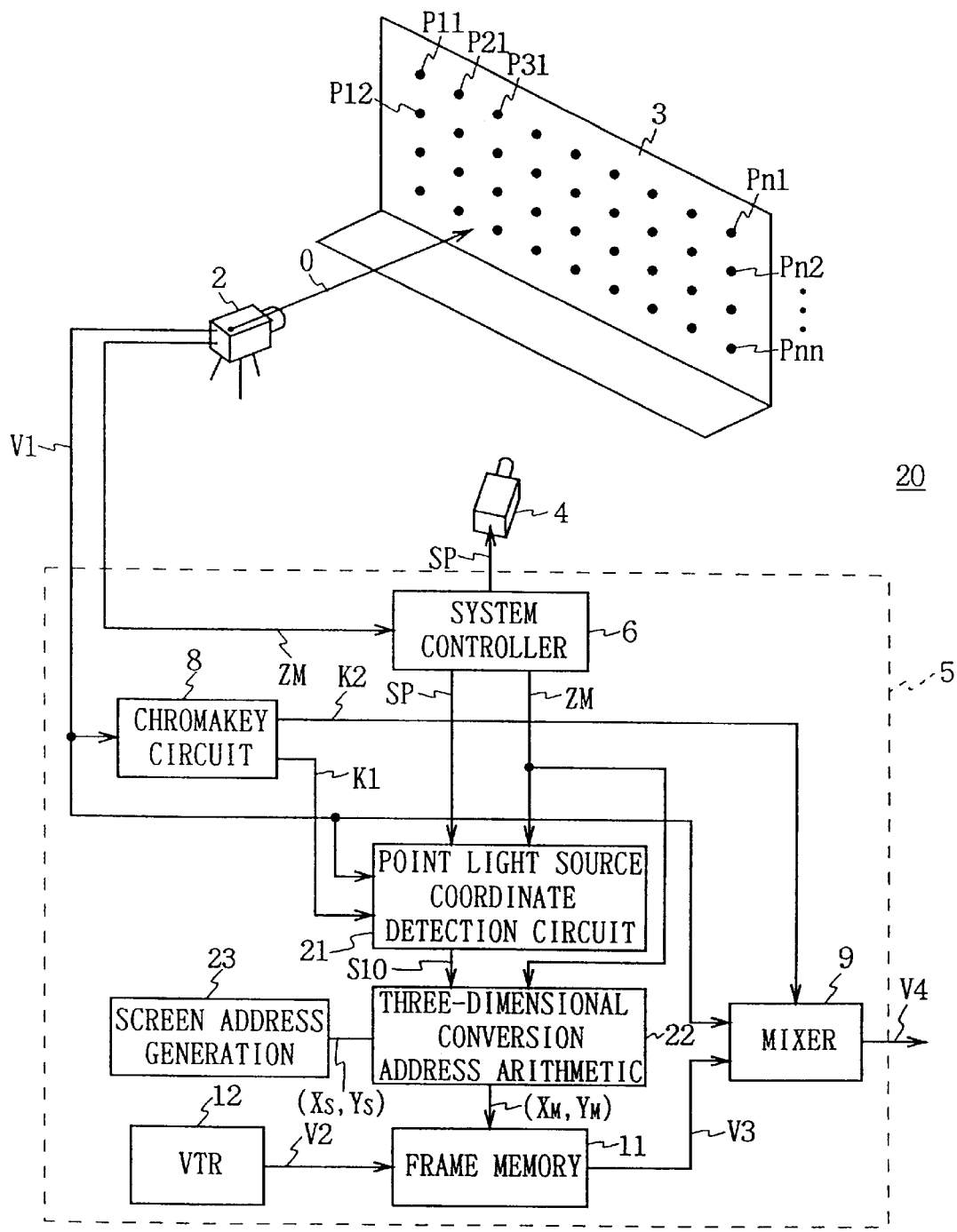
FIG. 14 is a block diagram showing the constitution of an image synthesizer according to a second embodiment.

In FIG. 14 where the same reference numerals are applied to parts corresponding to FIG. 1, reference numeral 20 generally denotes an image synthesizer according to the second embodiment. This image synthesizer 20 is also constituted basically by a video camera 2, a projector unit 4, and an image processing section 5. The essential difference with the image synthesizer 1 of the first embodiment is that a point light source coordinate detection circuit 21, a three-dimensional conversion address arithmetic circuit 22, and a screen address generation circuit 23 are provided newly.

Figure 15:
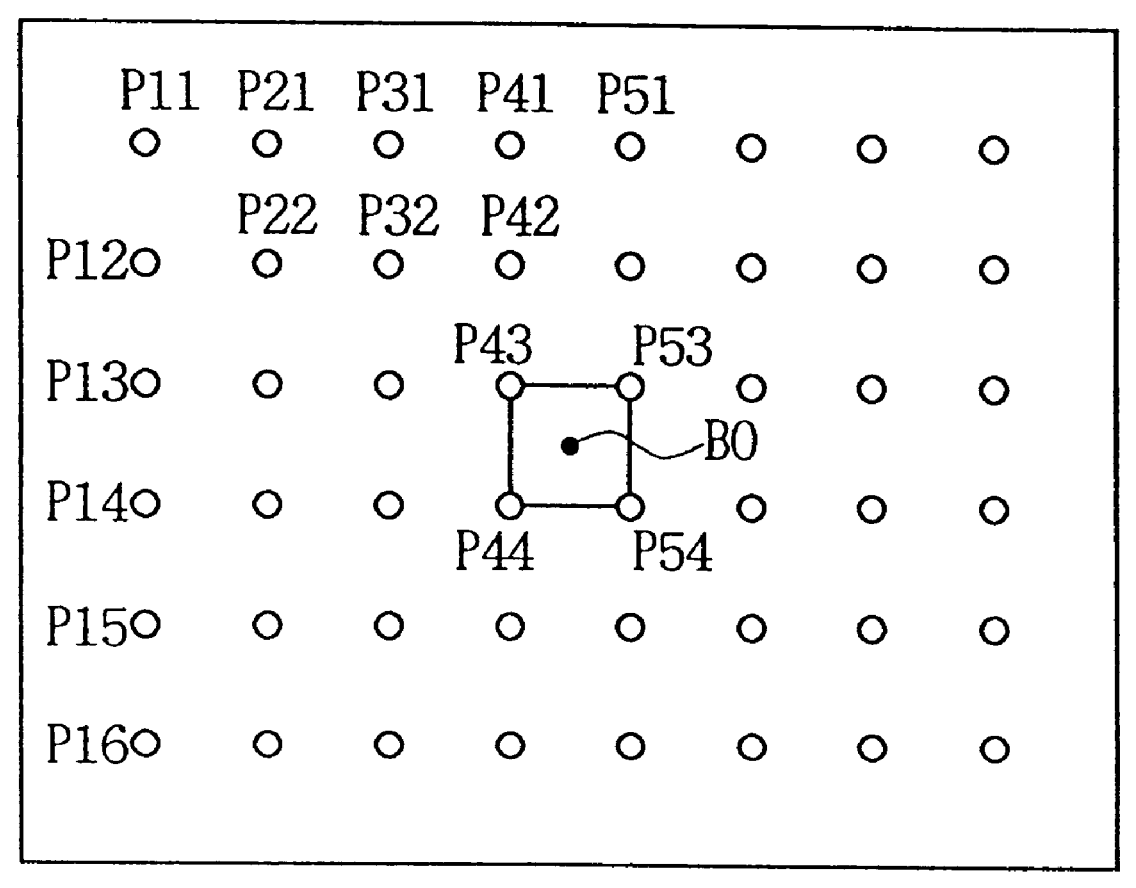

The point light source coordinate detection circuit 21 in this image synthesizer 20 is a circuit which detects from a video signal V1 the positions of four point light sources which become references among a plurality of point light sources P11 through Pnn projected on the background plate 2. In this image synthesizer 20 four point light sources P43, P44, P53, and P54 surrounding the center BO of the background plate 3 are reference point light sources as shown in FIG. 15. The point light source coordinate detection circuit 21 detects the position coordinates of the four point light sources P43, P44, P53, and P54 from the video signal V1.

Figure 16:
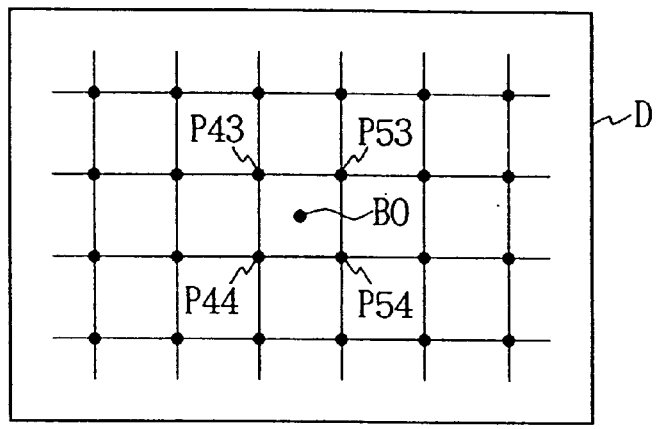
FIG. 16 is a schematic diagram used for a description of the background plate photographed from the front.
Figure 17:
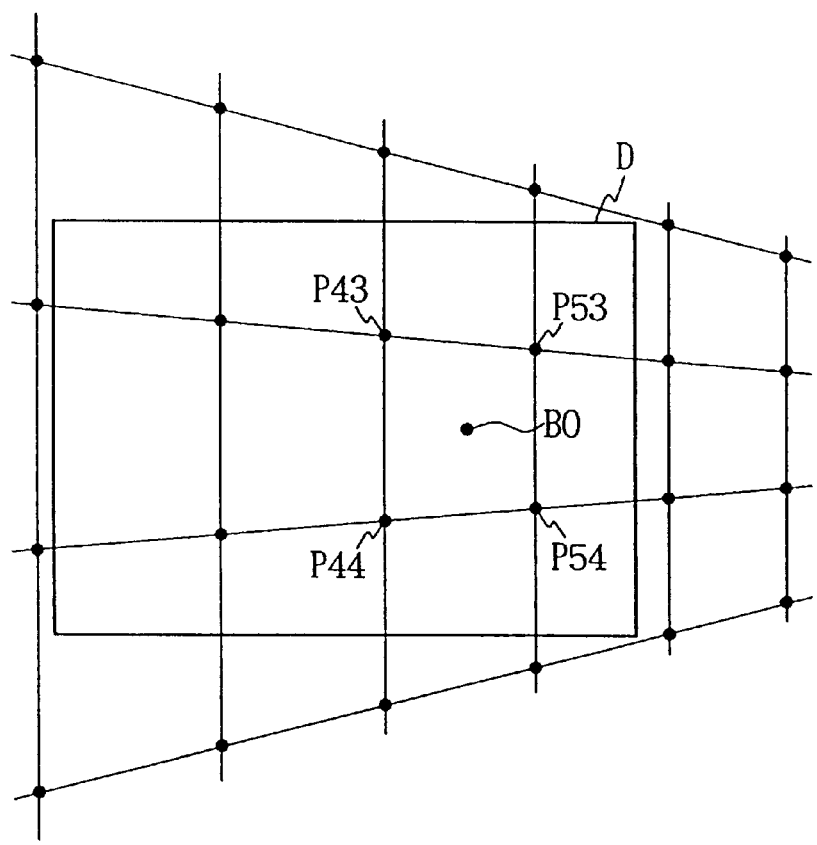
FIG. 17 is a schematic diagram used for a description of the detection of reference point light sources.

Describing specifically, the point light source coordinate detection circuit 21 detects where the four reference points P43, P44, P53, and P54 seen at the center of a field angle D when the background plate 3 is photographed from front, as shown in FIG. 16, have been moved on a monitor screen by movement of the video camera 2. For example, if it is assumed that the video signal V1 obtained by the photography of the video camera 2 is in a state such as that shown in FIG. 17, the point light source coordinate detection circuit 21 will detect the position coordinates of the four reference points P43, P44, P53, and P54 present on the monitor screen.

If the position of the place to which the reference point light sources P43, P44, P53, and P54 have been moved can be detected in this way, it can be detected whether the reference point light sources P43, P44, P53, and P54 are moved to such a place, if it is known what kind of three-dimensional conversion is performed, because the original positions of the reference point light sources P43, P44, P53, and P54 are previously known from the fact that the point light sources are arranged in matrix form on the background plate 3 at intervals of a predetermined pitch. That is, a conversion matrix for three-dimensional image conversion given to the reference point light sources P43, P44, P53, and P54 by movement of the video camera 2 is detectable. This conversion matrix is just a conversion matrix necessary for converting a background image to an image seen from the visual point of the video camera 2.

Figure 18:
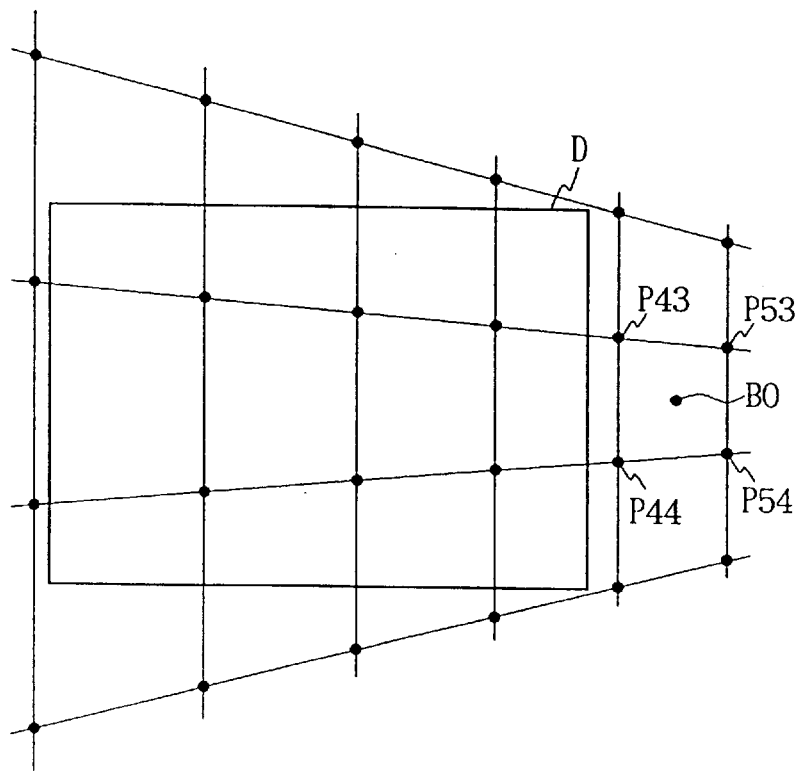
FIG. 18 is a schematic diagram used for a description of the case where reference point light sources are outside a field angle.

For this reason, the point light source coordinate detection circuit 21 first extracts from the video signal V1 an area where the signal level of the key signal K1 goes to a 11 thereby producing a video signal consisting only of a background portion. Then, the point light source coordinate detection circuit 21 reads out an identification code stored in the interior memory. Based on this identification code and a reference pulse signal SP, the point light source coordinate detection circuit 21 detects the position coordinates of the four reference point light sources P43, P44, P53, and P54 on the monitor screen from the video signal consisting only of a background portion. At this time, as shown in FIG. 18, since the four reference point light sources P43, P44, P53, and P54 are outside the field angle D of the video camera 2 or are hidden by a person standing in front of the background plate 3, in the case where they are not present inside a video signal consisting only of background, the point light source coordinate detection circuit 21 detects the position coordinates of the other point light sources present in the video signal and, based on the detected position coordinates, detects the position coordinates of the four reference point light sources P43, P44, P53, and P54 by interpolation.

The point light source coordinate detection circuit 21 outputs the position coordinates of the four reference point light sources P43, P44, P53, and P54 detected in this way to the three-dimensional conversion address arithmetic circuit 22 as detection data S10.

The three-dimensional conversion address arithmetic circuit 22 has grasped the position coordinates of the four reference point light sources P43, P44, P53, and P54 formed in matrix form at intervals of a predetermined pitch on the background plate 3. Therefore, based on these original position coordinates, the position coordinates of the four reference point light sources P43, P44, P53, and P54 based on the detection data S10 supplied from the point light source coordinate detection circuit 21, and furthermore on the zoom information ZM supplied from the system controller 6, the three-dimensional conversion address arithmetic circuit 22 computes a conversion matrix necessary for reference point light sources P43, P44, P53, and P54 to move to such a place on the monitor screen upon movement of the video camera 2. This conversion matrix is exactly equal to a conversion matrix that converts a background image which is synthesized with the background in the video signal V1 to an image seen from the visual point of the video camera 2.

The three-dimensional conversion address arithmetic circuit 22 computes an inverse matrix of this conversion matrix and multiplies a screen address $(X_S, Y_S)$ in raster scan order supplied from the screen address generation circuit 23 by the inverse matrix, thereby computing the read address $(X_M, Y_M)$ of the frame memory 11 and outputting it to the frame memory 11. The reason why the inverse matrix of a conversion matrix is computed is that the image synthesizer 20 does not multiply the background source video signal V2 by a conversion matrix and perform three-dimensional image conversion but writes the background source video signal V2 to memory and then performs three-dimensional image conversion such as that shown in a conversion matrix when reading out the background source video signal V2.

Figure 4:
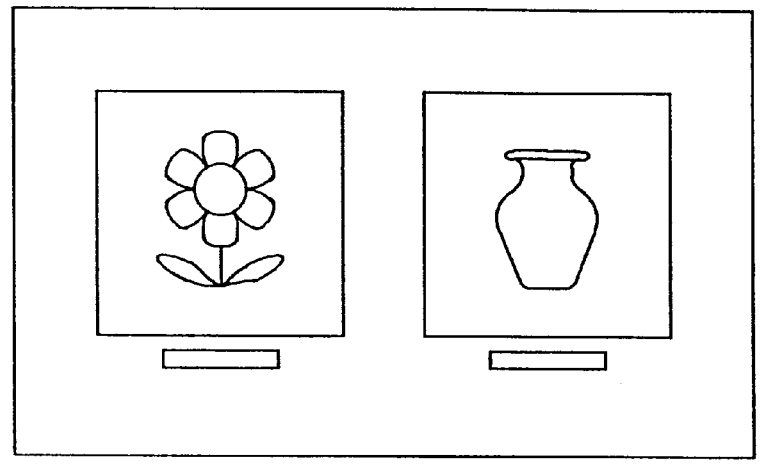
FIG. 4 is a video image diagram used for a description of the image conversion of a background source video signal.
Figure 4:
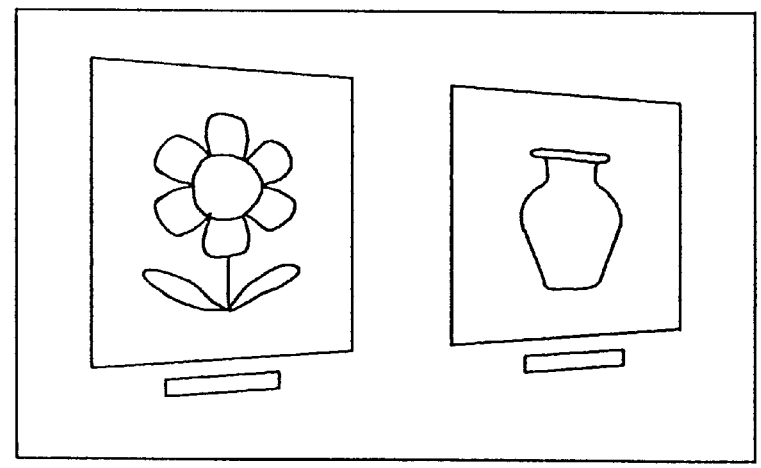
Figure 19:
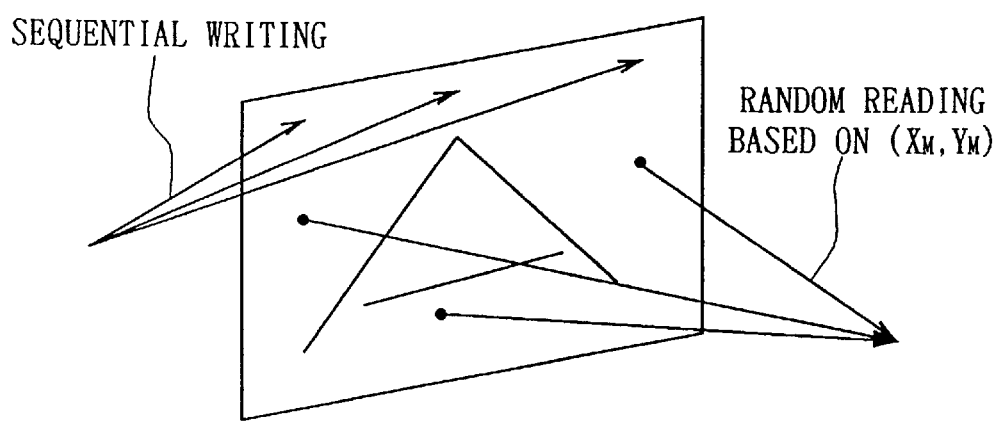
FIG. 19 is a schematic diagram used for a description of the operation of frame memory.

As shown in FIG. 19, the frame memory 11 sequentially writes the background source video V2 supplied from the video tape recorder 12, to the interior memory area and, based on the read address ($X_M$, $Y_M$) supplied from the three-dimensional conversion address arithmetic circuit 22, reads out the background source video signal V2, thereby producing such a background source video signal V3 as if a background image were seen from the position of the video camera 2, as shown in FIG. 4, and outputting it to the mixer circuit 9.

Thus, the mixer circuit 9, as with the first embodiment, selects and synthesizes the video signal V1 photographed with the video camera 2 and the background source video signal V3 given three-dimensional image conversion, based on the key signal K2 representative of the area of a subject, and thereby can produce the synthesized video signal V4 in which a background image has been deformed according to the position of the video camera 2, as shown in FIG. 5.

(2-2) Method of producing a read address in the three-dimensional conversion address arithmetic circuit:

In this paragraph, a description will be made of a method of producing a read address ($X_M$, $Y_M$) in the three-dimensional conversion address arithmetic circuit 22. In order for the background source video signal V2 to be inserted at the background plate 3 in the video signal V1, the background source signal V2 must be mapped onto the three-dimensional space in which the background plate 3 is present, and furthermore, it must be projected onto the monitor screen with the visual point position of an operator as the origin. This is because the background plate 3 is present on three-dimensional space and also the background plate 3 in the video signal V1 is one in which the background plate 3 present on the three-dimensional space was projected onto the monitor screen with the visual point position of an operator as the origin. Therefore, the three-dimensional conversion address arithmetic circuit 22 has to compute a conversion matrix which contains mapping onto three-dimensional space and projection from three-dimensional space to two-dimensional space, compute the inverse matrix of the conversion matrix, and produce a read address. This point will hereinafter be described specifically.

Figure 20:
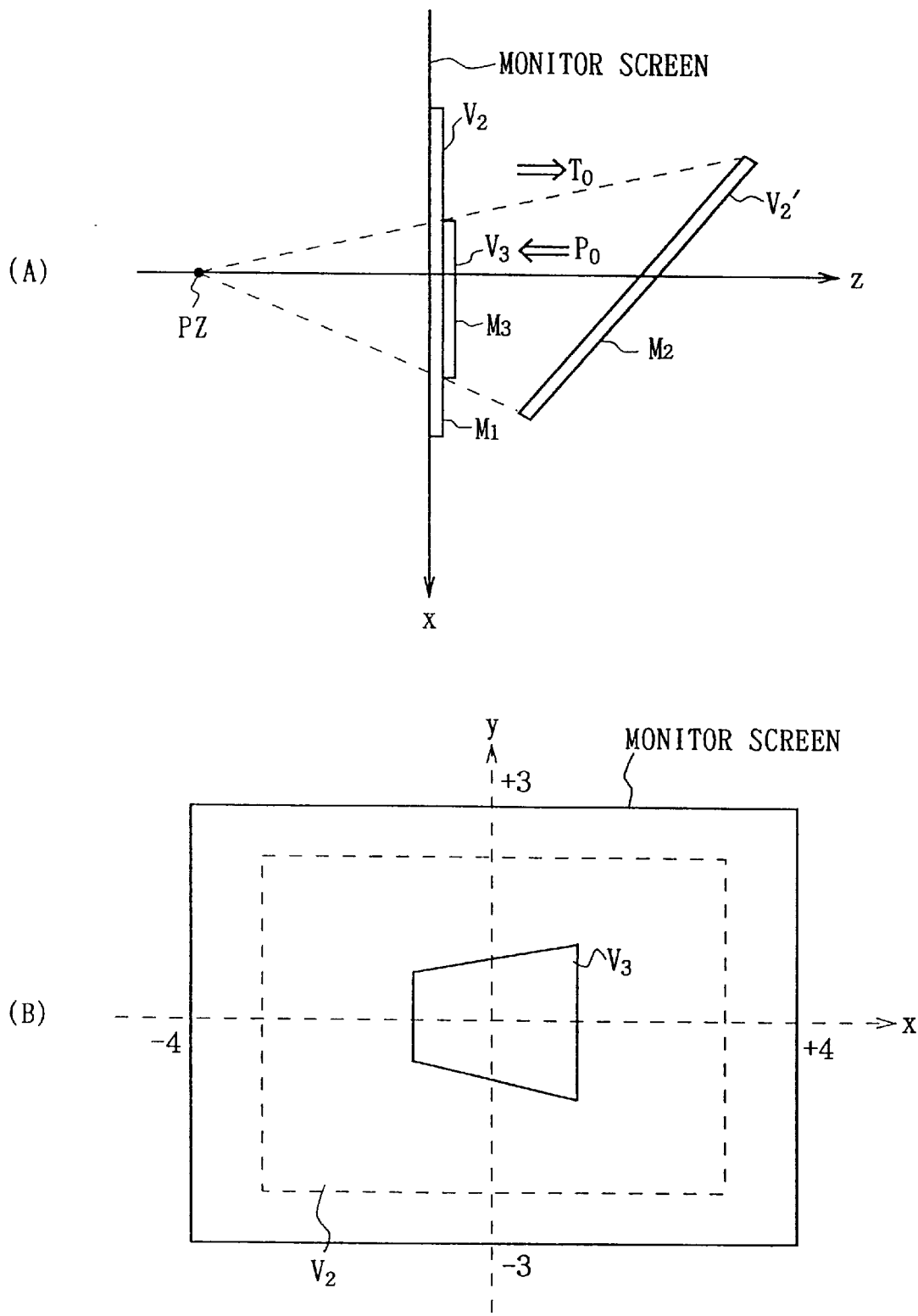
FIG. 20 is a schematic diagram used for a description of three-dimensional coordinates.

(2-2-1) Definition of a coordinate system:

First, a coordinate system for three-dimensional space will be described with FIGS. 20(A) and 20(B). The three-dimensional coordinate system used in this second embodiment is defined by an xyz rectangular coordinate system with the center of the monitor screen as origin, the horizontal direction of the monitor screen as x axis, the vertical direction of the monitor screen as y axis, and the perpendicular direction to the monitor screen as z axis, as shown in FIGS. 20(A) and 20(B). In this case, assume that for the x axis the right direction of the monitor screen is a positive direction and the left direction of the monitor screen a negative direction, for the y axis the up direction of the monitor screen is a positive direction and the down direction of the monitor screen a negative direction, and for the z axis the depth direction of the monitor screen is a positive direction and this side of the monitor screen (i.e., a side on which the visual point of an operator is present) a negative direction.

Also, for the x-axis direction inside the screen area, virtual coordinate values are set between −4 and +4, and for the y-axis direction inside the screen area, virtual coordinate values are set between −3 and +3. Of course, even outside the screen area, virtual coordinate values are set. In addition, the visual point position $P_z$ of an operator is virtually set at −16 on the z axis.

(2-2-2) Basic algorithm for three-dimensional image conversion:

Now, a description will be made of a method of producing the background source video signal V3 which is inserted at the background plate 3 in the video signal V1, by performing a three-dimensional image converting process (i.e., mapping onto three-dimensional space and projection from three-dimensional space onto a monitor screen surface) on the background source video signal V2.

First, the background source video V2 is stored on the frame memory 11 in its original state without performing any three-dimensional process. Since this background source video signal V2 is a two-dimensional video signal, in three-dimensional space it is a video signal present at position M, on the monitor screen, as shown in FIG. 20(A).

As described above, this background source video signal V2 must be coordinate-converted at the place of the background plate 3 present in three-dimensional space. Now, assume that the background plate 3 is in the positive direction of the z axis and present at position $M_2$ inclined about 45° to the screen surface as shown in FIG. 20(A). If the background plate 3 is present at position $M_2$ such as this, then parallel movement to the positive direction of the z axis with respect to the background source video signal V2 and a rotational process of about 45° on the y axis must be performed. Such a coordinate conversion process can be executed by using a three-dimensional conversion matrix $T_0$. That is, a video signal V2' present in three-dimensional space can be produced, by multiplying each pixel in the background source video signal V2 by the three-dimensional conversion matrix To.

This three-dimensional conversion matrix $T_0$ can be generally represented by the following equation:

$$T_0 = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \quad (5)$$

Conversion parameters $r_{11}$ through $r_{33}$ that are used in this conversion matrix $T_0$ are parameters containing elements for rotating the background source video signal V2 on the x-axis, y-axis, and z-axis, parameters containing elements for scaling up and down the background source video signal V2 in the x-axis direction, y-axis direction, and z-axis direction, and parameters containing elements for skewing the background source video signal V2 in the x-axis direction, y-axis direction, and z-axis direction. Also, conversion parameters $l_x$, $l_y$, and $l_z$ are parameters containing elements for making parallel movement of the background source video signal V2 in the x-axis direction, y-axis direction, and z-axis direction. A conversion parameter s is a parameter which is determined by the zoom information ZM of the video camera 2 and is a parameter containing elements for enlarging or reducing the entire background source video signal V2 uniformly in the respective axis directions of three-dimensional space.

Note that the conversion matrix $T_0$ becomes a 4×4 matrix because a coordinate system such as rotational conversion and coordinate systems such as parallel movement conversion and enlargement-reduction conversion are expressed in the same one coordinate system. Generally a coordinate system such as this is called a homogeneous coordinate system.

The background source video signal V2', coordinate-converted to three-dimensional space by using a three-dimensional conversion matrix in this way, is inserted at the place of the background plate 3 in the video signal V1, so a projection process must be performed on the monitor screen with the visual point of an operator as the origin. That is, in other words, as shown in FIG. 20(A), a background source video signal V3, which is projected onto the xy plane when the background source video signal V2' present at position $M_2$ in three-dimensional space is viewed from the virtual visual point $P_z$ on the z axis, must be computed. This projection process can be executed by using a perspective conversion matrix $P_0$. That is, the background source video signal V3 in which the background video signal V2' present in three-dimensional space is projected on the xy plane can be computed, by multiplying each pixel in the background source video signal V2' by the perspective conversion matrix $P_0$.

This perspective conversion matrix $P_0$ is generally represented by the following equation:

$$P_0 = \begin{bmatrix} 1 & 0 & 0 & 0 \\ 0 & 1 & 0 & 0 \\ 0 & 0 & 0 & P_z \\ 0 & 0 & 0 & 1 \end{bmatrix} \quad (6)$$

The parameter $P_z$ of this perspective conversion matrix Po is a perspective value for applying perspective representation when the background source video signal V2' is projected onto the xy plane. For this perspective value $P_z$, $1/16$ is usually set as a reference value. This means that the z coordinate value of the virtual visual point $P_z$ is $-16$. Note that this perspective value $P_z$ can also be changed to a predetermined value by operator's setting.

Thus, it becomes possible to insert the background source video signal V2 at the place of the background plate 3 in the video signal V1, by performing such coordinate conversion onto three-dimensional space and a projection process from three dimensional space to an xy plane on the background source video signal V2.

To make a long story short, the contents of the conversion process described above will be as follows: That is, this conversion process is constituted by a spatial image conversion step in which the three-dimensional background source video signal V2' is obtained from the background source video signal V2 by the three-dimensional conversion matrix $T_0$ and a perspective conversion step in which the perspective-converted background source video signal V3 is obtained from the three-dimensional background source video signal V2' by the perspective conversion matrix P0. Therefore, a conversion matrix T for obtaining the background source video signal V3 perspective-converted from the background source video signal V2 is represented as shown in the following equation by a multiplication equation between the three-dimensional conversion matrix $T_0$ and the perspective conversion matrix $P_0$.

$$T = T_0 \cdot P_0 = \begin{bmatrix} r_{11} & r_{12} & r_{13} & 0 \\ r_{21} & r_{22} & r_{23} & 0 \\ r_{31} & r_{32} & r_{31} & 0 \\ l_x & l_y & l_z & s \end{bmatrix} \begin{bmatrix} 1 & 0 & 0 & 0 \\ 0 & 1 & 0 & 0 \\ 0 & 0 & 0 & P_z \\ 0 & 0 & 0 & 1 \end{bmatrix} \quad (7)$$

$$= \begin{bmatrix} r_{11} & r_{12} & r_{13} & r_{13}P_z \\ r_{21} & r_{22} & r_{23} & r_{23}P_z \\ r_{31} & r_{32} & r_{31} & r_{33}P_z \\ l_x & l_y & l_z & l_zP_z + s \end{bmatrix}$$

Therefore, if each pixel in the background source video signal V2 is multiplied by the conversion matrix T. shown in Equation (7), the background source video signal V3 which can be inserted at the place of the background plate 3 of the video signal V1 can be generated.

Note that in this image synthesizer 20, when the background source video signal V3 is produced, the background source video signal V2 is not multiplied by the conversion matrix $T_0$, but actually, a read signal is computed so that the image conversion shown in the conversion matrix $T_0$ is performed, and based on the read address, the background source video signal V2 is read out of the frame memory 11, thereby producing the background source video signal V3 given image conversion.

That is, in this image synthesizer 20, the background source video signal V2 is written in sequence to the frame memory 11, and the background source video signal V2 is read out based on a read address such that the image conversion shown by the conversion matrix To is performed, thereby producing such a background source video signal V3 as to be able to insert the background source video signal V2 at the background plate 3 in the video signal V1.

Incidentally, the background source video signal V2 written to the frame memory 11 and the background source video signal V3 read out from the frame memory 11 are both two-dimensional video data, and the frame memory 11 is also memory for storing two-dimensional data. For this reason, in the computation of the read address which is used in the operation of reading video data out of the frame memory 11, the parameters for computing data present in the z-axis direction of three-dimensional space will not be used practically. Therefore, in the conversion matrix T shown in Equation (7), the third row and third column parameters for computing data present in the z-axis will be unnecessary.

That is, if a conversion matrix with parameters necessary actually for the computation of the read address is taken to be $T_{33}$, the conversion matrix $T_{33}$ will be represented by the following equation, which excludes the third row and third column of Equation (7).

$$T_{33} = \begin{bmatrix} r_{11} & r_{12} & r_{13}P_z \\ r_{21} & r_{22} & r_{23}P_z \\ l_x & l_y & l_zP_z + s \end{bmatrix} \quad (8)$$

Figure 21:
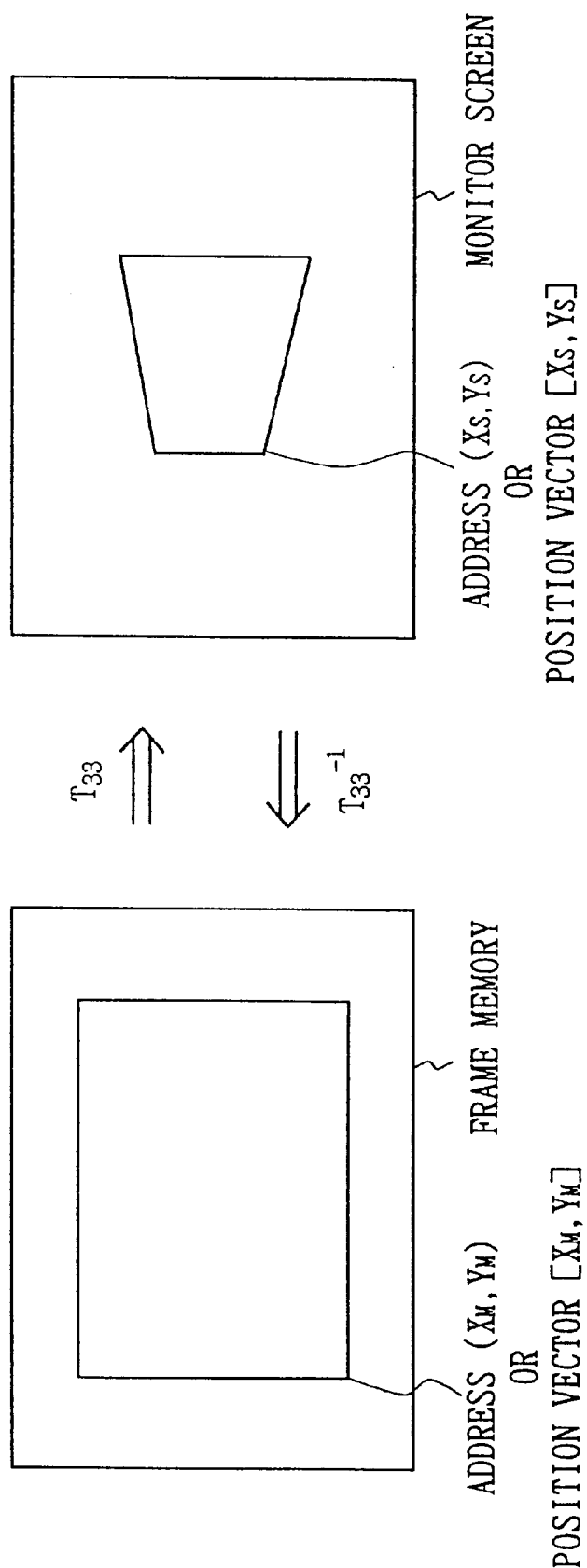
FIG. 21 is a schematic diagram used for a description of the corresponding relation between frame memory and a monitor screen.

Now, a description will be made of a read-address computation method which is used in the operation of reading out the background source video signal V2 from the frame memory 11. First, the relation between a position vector on the frame memory 11 and a position vector on the monitor screen will be described with FIG. 21.

First, let the two-dimensional address and the position vector on the frame memory 11 be $(X_M, Y_M)$ and $[X_M Y_M]$, respectively. Also, let the address and the position vector on the monitor screen be $(X_S, Y_S)$ and $[X_S Y_S]$, respectively. Subsequently, if the two-dimensional position vector $[X_M Y_M]$ on the frame memory 11 is expressed in terms of a homogeneous coordinate system, it can be represented as a vector $[x_m y_m H_0]$. If the position vector $[X_S Y_S]$ on the monitor screen is expressed in terms of a homogeneous coordinate system, it can be represented as a vector $[x_s\ y_s\ 1]$. Note the parameter H. of this homogeneous coordinate system is a parameter representative of the magnitude of a vector.

If the conversion matrix $T_{33}$ is performed on the position vector $[x_m\ y_m\ H_0]$ on the frame memory 11, the position vector $[x_m\ y_m\ H_0]$ on the frame memory 11 will be converted to the position vector $[x_s\ y_s\ 1]$ on the monitor screen. Therefore, the relational equation between the position vector $[x_x y_m\ H_0]$ on the frame memory 11 and the position vector $[x_s\ y_s\ 1]$ on the monitor screen can be represented by the following equation:

$$[x_s\ y_s\ 1] = [x_m\ y_m]\cdot T_{33} \quad (9)$$

Note that the relation between the parameter "$H_0$" of the homogeneous coordinate system used in the position vector $[x_m,\ y_m\ H_0]$ on the frame memory 11 and the parameter "1" of the homogeneous coordinate system used in the position vector $[x_s\ y_s, 1]$ on the monitor screen is that with the conversion matrix $T_{33}$, the position vector $[x_m\ y_m]$ on the frame memory 11 is converted to the position vector $[x_s\ y_s]$ on the monitor screen and also the magnitude "Hot" of the position vector $[x_m\ y_m]$ on the frame memory 11 is converted to the magnitude "1" of the position vector $[x_s y_s]$ on the monitor screen.

Incidentally, like this image synthesizer 20, in an apparatus where the read address corresponding to the conversion matrix $T_{33}$ is supplied to the frame memory 11 so that a spatial conversion process is performed on the background source video signal V2, there is no need to compute a point on the monitor screen which corresponds to a point on the frame memory 11 but there is a need to compute a point on the frame memory 11 which corresponds to a point on the monitor screen.

That is, there is a need to compute the position vector $[x_m\ y_m\ H_0]$ on the frame memory 11 by employing the inverse matrix $T_{33}^{-1}$ of the conversion matrix $T_{33}$, with the position vector $[x_s\ y_s\ 1]$ on the monitor screen 11 as a reference, as shown in the following equation transformed from Equation (9).

$$[x_m\ y_m\ H_0] = [x_s\ y_s\ 1]\cdot T_{33}^{-1} \quad (10)$$

Now, based on this idea, a description will hereinafter be made of a method of actually computing the two-dimensional position vector $[X_M\ Y_M]$ on the frame memory. First, the conversion matrix $T_{33}$ is expressed in terms of parameters $a_{11}$ through $a_{33}$, as shown in the following equation.

$$T_{33} = \begin{bmatrix} r_{11} & r_{12} & r_{13}P_z \\ r_{21} & r_{22} & r_{23}P_z \\ l_x & l_y & l_zP_z+s \end{bmatrix} = \begin{bmatrix} a_{11} & a_{12} & a_{13} \\ a_{21} & a_{22} & a_{23} \\ a_{31} & a_{32} & a_{33} \end{bmatrix} \quad (11)$$

Then, the inverse conversion matrix $T_{33}$ is expressed in terms of parameters $b_{11}$ through $b_{33}$, as shown in the following equation.

$$T_{33}^{-1} = \begin{bmatrix} a_{11} & a_{12} & a_{13} \\ a_{21} & a_{22} & a_{23} \\ a_{31} & a_{32} & a_{33} \end{bmatrix}^{-1} = \begin{bmatrix} b_{11} & b_{12} & b_{13} \\ b_{21} & b_{22} & b_{23} \\ b_{31} & b_{32} & b_{33} \end{bmatrix} \quad (12)$$

$$b_{ij} = \frac{a_{ji}}{\det(T_{33})}$$

Substituting the thus defined inverse matrix $T_{33}$ into the aforementioned Equation (10) and developing it gives the following equation:

$$[x_m\ y_m\ H_0] = [x_s\ y_s\ 1]\begin{bmatrix} b_{11} & b_{12} & b_{13} \\ b_{21} & b_{22} & b_{23} \\ b_{31} & b_{32} & b_{33} \end{bmatrix} = \quad (13)$$

$$[b_{11}x_s + b_{21}y_s + b_{31}\quad b_{12}x_s + b_{22}y_s + b_{32}\quad b_{13}x_s + b_{23}y_s + b_{33}]$$

From this Equation (13) the position vector $[x_m\ y_m\ H_0]$ on the frame memory 11 is represented as shown in the following equation:

$$x_m = b_{11}x_s + b_{21}y_s + b_{31}$$

$$y_m = b_{12}x_s + b_{22}y_s + b_{32}$$

$$H_0 = b_{13}x_s + b_{23}y_s + b_{33} \quad (14)$$

Now, in the case where the position vector $[x_m\ y_m\ H_0]$ of a homogeneous coordinate system on the frame memory 11, computed in this way, is converted to the two-dimensional position vector $[X_M\ Y_M]$ on the frame memory, the conversion will be performed as follows: That is, the parameter $H_0$, used when the two-dimensional position vector $[X_M\ Y_M]$ is converted to a homogeneous coordinate system, is a parameter representative of the magnitude of the position vector $[x_m\ y_m]$ of a homogeneous coordinate system. Therefore, in order to convert the position vector of a homogeneous coordinate system to a two-dimensional position vector, it will be sufficient if the parameters $x_m$ and $y_m$ representative of the position vector directions of a homogeneous coordinate system are normalized with the parameter $H_0$ representative of the magnitude of the position vector of a homogeneous coordinate system. Therefore, the parameters $X_M$ and $Y_M$ of the two-dimensional position vector on the frame memory can be computed by the following equation:

$$X_M = x_m/H_0$$

$$Y_M = y_m/H_0 \quad (15)$$

Also, in the case where the position vector $[x_s\ y_s\ 1]$ of a homogeneous coordinate system on the monitor screen is converted to the two-dimensional position vector $[X_S\ Y_S]$ on the frame memory, the conversion can be performed in the same way. It will be sufficient if the parameters $x_s$ and $y_s$ representative of the position vector directions of a homogeneous coordinate system are normalized with the parameter "1" representative of the magnitude of the position vector of a homogeneous coordinate system. Therefore, the parameters $X_S$ and $Y_S$ of the two-dimensional position vector on the monitor screen can be computed by the following equation:

$$X_S = x_s$$

$$Y_S = y_s \quad (16)$$

Therefore, substituting Equations (14) and (16) into Equation (15) yields the parameters $X_M$ and $Y_M$ of the two-dimensional position vector on the frame memory 11 which can be represented by the following equations:

$$X_M = \frac{x_m}{H_0} \quad (17)$$

$$= \frac{b_{11}x_s + b_{21}y_s + b_{31}}{b_{13}x_s + b_{23}y_s + b_{33}}$$

$$= \frac{b_{11}X_S + b_{21}Y_S + b_{31}}{b_{13}X_S + b_{23}Y_S + b_{33}}$$

$$Y_M = \frac{y_m}{H_0} \quad (18)$$

$$= \frac{b_{12}x_s + b_{22}y_s + b_{32}}{b_{13}x_s + b_{23}y_s + b_{33}}$$

$$= \frac{b_{12}X_S + b_{22}Y_S + b_{32}}{b_{13}X_S + b_{23}Y_S + b_{33}}$$

With Equations (17) and (18), the position vector $[X_M\ Y_M]$ on the frame memory 11 can be computed and also the read address $(X_M, Y_M)$ on the frame memory can be computed.

Now, the parameters of the inverse matrix $T_{33}^{-1}$ which are used in Equations (17) and (18) will be computed. The parameters $b_{31}$ through $b_{33}$ of the inverse matrix $T_{33}^{-1}$ can be represented as shown in the following equations, by using the parameters $a_{11}$ through $a_{33}$ of the conversion matrix $T_{33}$.

$$b_{11} = \frac{-a_{32}a_{23} + a_{22}a_{33}}{W_1} \quad (19)$$

$$b_{12} = \frac{a_{32}a_{13} - a_{12}a_{33}}{W_1} \quad (20)$$

$$b_{13} = \frac{-a_{22}a_{13} + a_{12}a_{23}}{W_1} \quad (21)$$

$$b_{21} = \frac{a_{31}a_{23} - a_{21}a_{33}}{W_1} \quad (22)$$

$$b_{22} = \frac{-a_{31}a_{13} + a_{11}a_{33}}{W_1} \quad (23)$$

$$b_{23} = \frac{a_{21}a_{13} - a_{11}a_{23}}{W_1} \quad (24)$$

$$b_{31} = \frac{-a_{22}a_{31} + a_{21}a_{32}}{W_1} \quad (25)$$

$$b_{32} = \frac{a_{12}a_{31} - a_{11}a_{32}}{W_1} \quad (26)$$

$$b_{33} = \frac{-a_{12}a_{21} + a_{11}a_{22}}{W_1} \quad (27)$$

where the parameter $W_1$ is a value indicated by the following equation:

$$W_1 = -a_{22}a_{31}a_{13} + a_{21}a_{32}a_{13} + a_{12}a_{31}a_{23} - a_{11}a_{32}a_{23} - a_{12}a_{21}a_{33} + a_{11}a_{22}a_{33} \quad (28)$$

From Equation (11) the parameters a11 through $a_{33}$ are represented by the following equations:

$$a_{11}=r_{11},\ a_{12}=r_{12},\ a_{13}=r_{13}P_z \quad (29)$$

$$a_{21}=r_{21},\ a_{22}=r_{22},\ a_{23}=r_{23}P_z \quad (30)$$

$$a_{31}=l_x,\ a_{32}=l_y,\ a_{33}=l_zP_z+s \quad (31)$$

Therefore, if Equations (29) through (31) are substituted into Equations (19) through (28), Equations (19) through (28) can be transformed as shown in the following equations:

$$b_{11} = \frac{-l_y r_{23} P_z + r_{22}(l_z P_z + s)}{W_1} \quad (32)$$

$$b_{12} = \frac{l_y r_{13} P_z + r_{12}(l_z P_z + s)}{W_1} \quad (33)$$

$$b_{13} = \frac{-r_{22}r_{13}P_z + r_{12}r_{23}P_z}{W_1} \quad (34)$$

$$b_{21} = \frac{l_x r_{23} P_z - r_{21}(l_z P_z + s)}{W_1} \quad (35)$$

$$b_{22} = \frac{-l_x r_{13} P_z + r_{11}(l_z P_z + s)}{W_1} \quad (36)$$

$$b_{23} = \frac{r_{21}r_{13}P_z - r_{11}r_{23}P_z}{W_1} \quad (37)$$

$$b_{31} = \frac{-r_{22}l_x + r_{21}l_y}{W_1} \quad (38)$$

$$b_{32} = \frac{r_{12}l_x - r_{11}l_y}{W_1} \quad (39)$$

$$b_{33} = \frac{-r_{12}r_{21} + r_{11}r_{22}}{W_1} \quad (40)$$

$$W_1 = -r_{22}l_x r_{13} P_z + r_{21}l_y r_{13} P_z + r_{12}l_x r_{23} P_z - r_{11}l_y r_{23} P_z - r_{12}r_{21}(l_z P_z + s) + r_{11}r_{22}(l_z P_z + s) \quad (41)$$

Therefore, if Equations (32) through (41) are substituted into Equations (17) and (18), the read address $(X_M, Y_M)$ of the frame memory 11 can be computed by the following equations:

$$X_M = \frac{1}{H_0}[\{-l_x r_{23} P_z + r_{22}(l_z P_z + s)\}X_S + \quad (42)$$
$$\{l_y r_{13} P_z + r_{12}(l_z P_z + s)\}Y_S + (-r_{22}r_{13}P_z + r_{12}r_{23}P_z)]$$

$$Y_M = \frac{1}{H_0}[\{l_x r_{23} P_z - r_{21}(l_z P_z + s)\}X_S + \quad (43)$$
$$\{-l_y + r_{11}(l_z P_z + s)\}Y_S + (r_{21}r_{13}P_z - r_{11}r_{23}P_z)]$$

Note that the parameter $H_0$ can be represented by the following equation, by substituting Equation (14) into Equations (38) through (40).

$$H_0 = (-r_{21}l_x + r_{21}l_y)X_S + (r_{12}l_x - r_{11}l_y)Y_S + (-r_{12}r_{21} + r_{11}r_{22}) \quad (44)$$

Thus, the read address $(X_M, Y_M)$ of the frame memory 11 can be represented by the parameters $(r_{11}$ through $r_{33}, l_x, l_y, l_z, s,$ and $P_z)$ of the conversion matrix $T_{33}$. Therefore, if the screen address $(X_S, Y_S)$ is supplied for each pixel to Equations (42) through (44) so that it corresponds to the raster scan order of the monitor screen, then the read address $(X_M, Y_M)$ on the frame memory corresponding to the supplied screen address can be computed in order.

(2-2-3) Method of computing the conversion matrix $T_{33}$:

As described above, if the parameters of the conversion matrix $T_{33}$ are known, the read address $(X_M, Y_M)$ of the frame memory 11 can be computed by using Equations (42) through (44). Here, a method of computing the parameters of the conversion matrix $T_{33}$ will be described.

The relation between the position vector on the frame memory 11 and the position vector on the monitor screen is relation such as that shown in Equation (9), as described above. Therefore, if actual values of position vectors are substituted into Equation (9), the parameters of the conversion matrix $T_{33}$ can be computed.

The position vectors on the monitor screen use the position vectors of the four light point sources P43, P44, P53, and P54 detected by the point light source coordinate detection circuit 21. Also, for the position vectors on the frame memory, the entire background plate 3 is assumed to be the entire memory area of the frame memory and the position vectors on the frame memory 11 corresponding to the point light sources P43, P44, P53, and P54 at that time are used.

First, the position vectors of the four light point sources P43, P44, P53, and P54 detected by the point light source coordinate detection circuit 21 are taken to be $[X_1, y_1]$, $[X_2, Y_2]$, $[X_3, Y_3]$, and $[X_4, Y_4]$ in order. The position vectors on the frame memory 11 corresponding to the original positions of the four light point sources P43, P44, P53, and P54 are taken to be $[X'_1, Y'_1]$, $[X'_2, Y'_2]$, $[X'_3, Y'_3]$, and $[X'_4, Y'_4]$ in order. If these position vectors are expressed with a homogeneous coordinate system, the position vectors on the monitor screen of the light point sources P43, P44, P53, and P54 will be represented with the following equation:

$$[X_i K_i \ Y_i K_i \ K_i] \quad i=1 \text{ to } 4 \tag{45}$$

The position vectors on the frame memory are represented with the following equation:

$$[X'_i \ Y'_i \ 1] \quad i=1 \text{ to } 4 \tag{46}$$

Substituting these position vectors of a homogeneous coordinate system into Equation (9) gives the following equation:

$$[X_i K_i \ Y_i K_i \ K_i] = [X'_i \ Y'_i \ 1] \cdot T_{33} \tag{47}$$

The conversion matrix $T_{33}$ is defined as shown in the following equation:

$$T_{33} = \begin{bmatrix} a_{11} & a_{12} & a_{13} \\ a_{21} & a_{22} & a_{23} \\ a_{31} & a_{32} & a_{33} \end{bmatrix} \tag{48}$$

Therefore, Equation (47) can be transformed as shown in the following equation:

$$[X_i \cdot K_i \ Y_i \cdot K_i \ K_i] = [X'_i \ Y'_i \ 1] \cdot \begin{bmatrix} a_{11} & a_{12} & a_{13} \\ a_{21} & a_{22} & a_{23} \\ a_{31} & a_{32} & a_{33} \end{bmatrix} \tag{49}$$

Developing Equation (49) gives the following equation:

$$[X_i \cdot K_i \ Y_i \cdot K_i \ K_i] = \tag{50}$$
$$[a_{11}X'_i + a_{21}Y'_i + a_{31} \quad a_{12}X'_i + a_{22}Y'_i + a_{32} \quad a_{13}X'_i + a_{23}Y'_i + a_{33}]$$

from Equation (50) the following equations are obtained for parameters $X_i$, $Y_i$, and $K_i$.

$$X_i K_i = a_{11}X'_i + a_{21}Y'_i + a_{31} \tag{51}$$

$$Y_i K_i = a_{12}X'_i + a_{22}Y'_i + a_{32} \tag{52}$$

$$K_i = a_{13}X'_i + a_{23}Y'_i + a_{33} \tag{53}$$

Substituting Equation (53) into Equations (51) and (52) gives the following equations for parameters $X_i$ and $Y_i$.

$$X_i = \frac{a_{11}X'_i + a_{21}Y'_i + a_{31}}{a_{13}X'_i + a_{23}Y'_i + a_{33}} \tag{54}$$

$$Y_i = \frac{a_{12}X'_i + a_{22}Y'_i + a_{32}}{a_{13}X'_i + a_{23}Y'_i + a_{33}} \tag{55}$$

Dividing the denominator and the numerator of the right side of each of Equations (54) and (55) by the parameter $a_{33}$ gives the following equations:

$$X_i = \frac{a_{11}/a_{33} \cdot X'_i + a_{21}/a_{33} \cdot Y'_i + a_{31}/a_{33}}{a_{13}/a_{33} \cdot X'_i + a_{23}/a_{33} \cdot Y'_i + 1} \tag{56}$$

$$Y_i = \frac{a_{12}/a_{33} \cdot X'_i + a_{22}/a_{33} \cdot Y'_i + a_{32}/a_{33}}{a_{13}/a_{33} \cdot X'_i + a_{23}/a_{33} \cdot Y'_i + 1} \tag{57}$$

Therefore, it is found that the values of the parameters $X_i$ and $Y_i$ do not change even by dividing them by the parameter $a_{33}$. Therefore, even if the conversion matrix $T_{33}$ were replaced with a conversion matrix $T_{33}'$ shown in the following equation $$T'_{33} = \begin{bmatrix} a_{11}/a_{33} & a_{12}/a_{33} & a_{13}/a_{33} \\ a_{21}/a_{33} & a_{22}/a_{33} & a_{23}/a_{33} \\ a_{31}/a_{33} & a_{32}/a_{33} & 1 \end{bmatrix} \tag{58}$$

$$= \begin{bmatrix} a'_{11} & a'_{12} & a'_{13} \\ a'_{21} & a'_{22} & a'_{23} \\ a'_{31} & a'_{32} & 1 \end{bmatrix}$$

, Equation (49) would be established. That is, the following equation is established.

$$[X_i \cdot K_i \ Y_i \cdot K_i \ K_i] = [X'_i \ Y'_i \ 1] \cdot T'_{33} \tag{59}$$

$$= [X'_i \ Y'_i \ 1] \cdot \begin{bmatrix} a'_{11} & a'_{12} & a'_{13} \\ a'_{21} & a'_{22} & a'_{23} \\ a'_{31} & a'_{32} & 1 \end{bmatrix}$$

If Equation (59) is developed for i=1 through 4, 12 simultaneous linear equations will be obtained for parameters $a_{11}'$ through $a_{33}'$ and $K_1$ through $K_4$, as shown in the following equations.

$$X_i K_1 a_{12}'X'_1 + a_{21}'Y'_1 + a_{32}' \tag{60}$$

$$Y_i K_1 = a_{12}'X'_1 + a_{22}'Y'_1 + a_{32}' \tag{61}$$

$$K_1 = a_{13}'X'_1 + a_{23}'Y'_1 + 1 \tag{62}$$

$$X_2 \cdot K_2 = a_{11}'X'_2 + a_{21}'Y'_2 + a_{31}' \tag{63}$$

$$Y_2 \cdot K_2 = a_{12}'X'_2 + a_{22}'Y'_2 + a_{32}' \tag{64}$$

$$K_2 = a_{13}'X'_2 + a_{23}'Y'_2 + 1 \tag{65}$$

$$X_3 \cdot K_3 = a_{11}'X'_3 + a_{21}'Y'_3 + a_{31}' \tag{66}$$

$$Y_3 \cdot K_3 = a_{12}'X'_3 + a_{22}'Y'_3 + a_{32}' \tag{67}$$

$$K_3 = a_{13}'X'_3 + a_{23}'Y'_3 + 1 \tag{68}$$

$$X_4 \cdot K_4 = a_{11}'X'_4 + a_{21}'Y'_4 + a_{31}' \tag{69}$$

$$Y_4 \cdot K_4 = a_{12}'X'_4 + a_{22}'Y'_4 + a_{32}' \tag{70}$$

$$K_4 = a_{13}'X'_4 + a_{23}'Y'_4 + 1 \tag{71}$$

These simultaneous linear equations can be solved because there are 12 parameters in total. Therefore, parameters $a_{11}'$ through $a_{33}'$ can be computed, and the conversion matrix $T_{33}'$ can be computed. Note that the conversion matrix $T_{33}$ can be computed if the computed conversion matrix $T_{33}'$ is multiplied by the enlargement-reduction parameter $a_{33}$ which is given as zoom information ZM.

(2-2-4) Method of producing a read address:

The three-dimensional conversion address arithmetic circuit 22 produces a read address which is supplied to the frame memory 11 in the procedure described above. That is, based on the position vectors of the reference point light sources P43, P44, P53, and P54 supplied as detection data S10 from the point light source coordinate detection circuit 21 and based on the position vectors on the frame memory 11 corresponding to the positions of the reference point light sources P43, P44, P53, and P54 when it is assumed that the whole of the background plate 3 corresponds to the memory area of the frame memory, the three-dimensional conversion address arithmetic circuit 22 sets the aforementioned simultaneous linear equations for the parameters of the conversion matrix $T_{33}$ and solves the solutions of the simultaneous linear equations, thereby computing the conversion matrix $T_{33}$. Then, the three-dimensional conversion address arithmetic circuit 22 uses the parameters of the computed conversion matrix $T_{33}$ and computes the inverse matrix $T_{33}^{-1}$. Based on the parameters of the inverse matrix $T_{33}^{-1}$ and the screen address $(X_S, Y_S)$ supplied from the screen address generator 23, the three-dimensional conversion address arithmetic circuit 22 computes the read address $(X_M, Y_M)$ which is supplied to the frame memory 11, and supplies it to the frame memory 11. More specifically, actually the procedure for computing the inverse matrix $T_{33}^{-1}$ from the conversion matrix $T_{33}$ is omitted and the aforementioned Equations (42) through (44) are computed with the parameters of the conversion matrix $T_{33}$, thereby computing the read address $(X_M, Y_M)$ directly.

Figure 22:
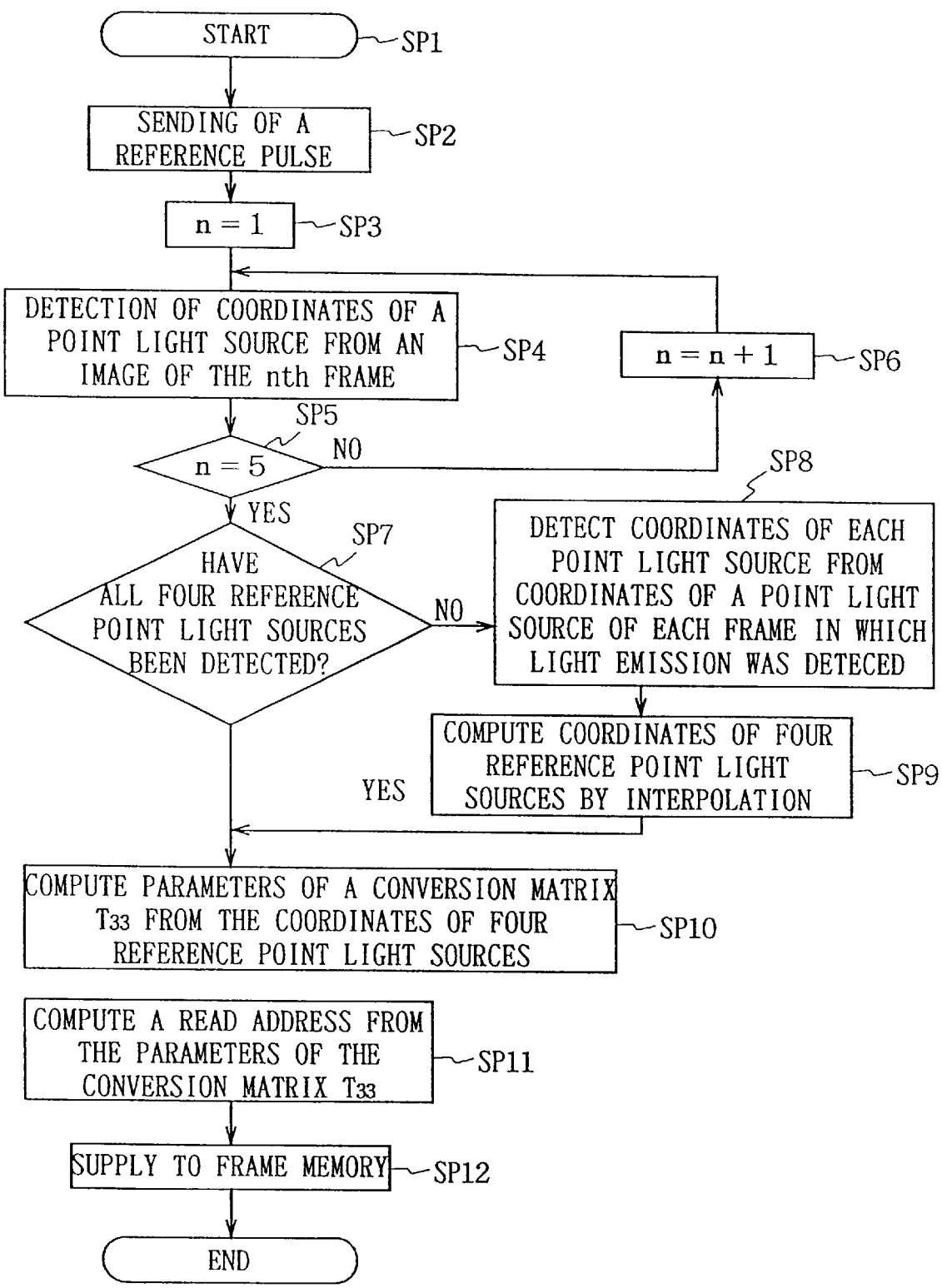
FIG. 22 is a flowchart showing a method of computing a read address according to the second embodiment.

(2-2-5) Procedure for computing a read address:

Finally, in this paragraph a method of computing a read address necessary for performing the image conversion of the background source video signal V2 will be described with a flowchart shown in FIG. 22.

First, in step SP2 from step SP1, the system controller 6 drives and controls the projector unit 4, thereby projecting a plurality of point light sources P11 through Pnn onto the background plate 3 so that an on-and-off pattern is repeated at five-frame cycles, and also sends out a reference pulse signal SP representative of the head frame of the five-frame cycle to the point light source coordinate detection circuit 21.

Figure 23:
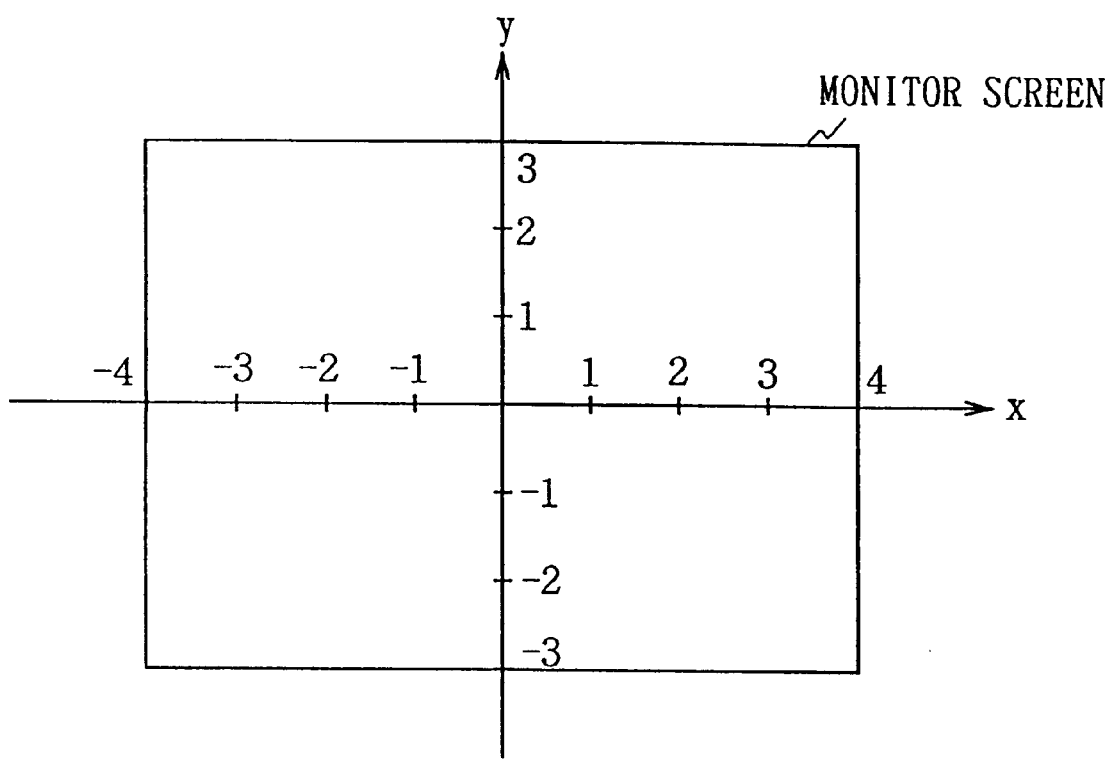
FIG. 23 is a schematic diagram used for a description of the detected coordinates of a point light source.

In the following step SP3, the point light source coordinates detection circuit 21 sets the value of the interior counter n to a 1 in response to reception of this reference pulse signal SP and, in the following step SP4, detects the coordinates of a point light source from the background image of the video signal V1 corresponding to the first frame of the five-frame cycle. Note that the point light source coordinates mean coordinates on the monitor screen with the center of the monitor screen, i.e., the optical axis as origin, as shown in FIG. 23.

In the following step SP5, the point light source coordinate detection circuit 21 judges whether the value of the previously set value of the counter n has reached the last frame of the five-frame cycle by judging whether the value of the counter n has reached 5. In this case, since the value of the counter n is 1, step SP5 advances to step SP6. In step SP6 the point light source coordinate detection circuit 21 adds 1 to the value of the counter n, and step SP6 returns to step SP4 again.

In step SP4, point light source coordinates are likewise detected from the background image of the video signal V1 corresponding to the second frame of the five-frame cycle. In the same way, point light source coordinates are hereinafter detected from the background images of the video signal Vi corresponding to the frames of the five-frame cycle, by repeating step SP5 and step SP6.

Thus, if the detection of the point light source coordinates from the video signals Vi of five frames has been completed, it will mean that the value of the counter n will reach 5 and therefore the point light source coordinate detection circuit 21 will advance from step SP5 to step SP7.

In step SP7, the point light source coordinate detection circuit 21 judges whether or not point light sources corresponding to reference point light sources P43, P44, P53, and P54 are all present in the point light source with coordinates detected from the video signals V1 of five frames. As a result, in the case where the point light sources corresponding to reference point light sources P43, P44, P53, and P54 are all present, the coordinates of the reference point light sources P43, P44, P53, and P54 are output to the three-dimensional conversion address arithmetic circuit 22 as detection data S10.

On the other hand, in the case where the point light sources corresponding to reference point light sources P43, P44, P53, and P54 are not all present, in step SP8 the point light source coordinate detection circuit 21 detects the coordinates of each point light source, based on the coordinates of the point light source of each frame turned on. In the following step SP9, the point light source coordinate detection circuit 21 computes the coordinates of the reference point light sources P43, P44, P53, and P54 by an interpolation process, based on the detected point light source coordinates, and also outputs them to the three-dimensional conversion address arithmetic circuit 22 as detection data. Note that the case where reference point light sources are hidden by a person standing in front of the background plate 3 or are outside the field angle of the video camera 2 is considered as the case where the reference point light sources P43, P44, P53, and P54 are not present in five frames.

In step SP10, the three-dimensional conversion address arithmetic circuit 22 receiving the coordinates of the reference point light sources P43, P44, P53, and P54 from the point light source coordinate detection circuit 21 computes the parameters of the conversion matrix $T_{33}$, based on the coordinates of the reference point light sources P43, P44, P53, and P54. In the following step SP11, the three-dimensional conversion address arithmetic circuit 22 computes a read address $(X_M, Y_M)$, based on the computed parameters of the conversion matrix $T_{33}$. In the following step SP12, the three-dimensional conversion address arithmetic circuit 22 supplies the read address $(X_M, Y_M)$ to the frame memory 11.

In this way, in this image synthesizer 20, the coordinates of the reference point light sources P43, P44, P53, and P54 projected on the background plate 3 are detected from the video signal V1, the parameters of the conversion matrix $T_{33}$ for performing image conversion on the background source video V2 are computed based on the detected coordinates of the four points, and the read address $(X_M, Y_M)$ to the frame memory 11 is computed based on the computed parameters of the conversion matrix $T_{33}$. Therefore, based on this read signal $(X_M, Y_M)$, if the background source video signal V2 is read out from the frame memory 11, such a background source video signal V3 as if viewed from the video camera 2 can be easily produced, as shown FIG. 4.

(2-3) Operation and advantageous effects:

In the aforementioned constitution, this image synthesizer 20 first drives the projector unit 4, thereby projecting point light sources P11 through Pnn onto the background plate 3 installed in the background of a person who becomes a subject to be photographed. At this time, the point light sources P11 through Pnn are turned on and off with a fixed pattern with the five-frame repetitive cycle so that the point light sources P11 through Pnn can be identified later.

With the state in which the point light sources P11 through Pnn have been projected on the background plate 3 in this way, a person being a subject is photographed by the video camera 2, and the resultant video signal V1 is input to the image processing section 5. The zoom information ZM used in the photography of the video camera 2 is also input to the image processing section 5.

In the image processing section 5 the video signal V1 is first input to the chromakey circuit 8. The chromakey circuit 8 extracts a color signal corresponding to the hue of the background plate 3 from the video signal V1 and compares the color signal with a predetermined threshold value, thereby producing a key signal K1 representative of the background portion of the video signal V1 and also producing a key signal K2 representative of the subject portion of the video signal V1.

The point light source coordinate detection circuit 21 first receives this key signal K1 and video signal V1 and, based on the key signal K1, produces a video signal consisting only of a background portion from the video signal V1. Then, the point light source coordinate detection circuit 21 reads out an identification code consisting of the on-and-off information of a point light source stored in the interior memory. Based on the identification code, the point light source coordinate detection circuit 21 detects the previously set four reference point light sources P43, P44, P53, and P54 from the video signal consisting only of a background portion, and detects the position coordinates of the reference point light sources P43, P44, P53, and P54 on the monitor screen. At this time, the reference point light sources P43, P44, P53, and P54 are hidden by a person standing in front of the background plate 3 or are outside the field angle D of the video camera 2, so in the case where the reference point light sources P43, P44, P53, and P54 are not present in the video signal consisting only of a background portion, the point light source coordinate detection circuit 21 detects the position coordinates of the other point light sources present in the video signal, and detects the position coordinates of the four reference point light sources P43, P44, P53, and P54 by interpolation, based on the detected position coordinates.

The three-dimensional conversion address arithmetic circuit 22 computes the conversion matrix $T_{33}$ for performing three-dimensional image conversion on the background source video signal V2, based on the position coordinates of the four reference point light sources P43, P44, P53, and P54, and computes a read address $(X_M, Y_M)$ which is supplied to the frame memory 11, based on the parameters of the conversion matrix $T_{33}$.

Based on the read address $(X_M, Y_M)$, the frame memory 11 reads out the background source video signal V2 stored in the memory area, thereby producing such a background source video signal V3 as if a background image were seen from the position of the video camera 2, as shown in FIG. 4. Therefore, if the background source video signal V3 and the video signal V1 are synthesized together based on the key signal K2, a synthesized video signal V4 with no feeling of physical disorder in which a background image has been deformed according to the position of the video camera 2 can be produced as shown in FIG. 5.

In this way, in this image synthesizer 20 of the second embodiment, four of a plurality of point light sources P11 through Pnn are previously set as reference point light sources, the position coordinates of the four reference point light sources on the monitor screen are detected from the video signal V1, and a read address for the image conversion of a background image is generated based on the position coordinates of the four points. Therefore, with even simpler constitution than the first embodiment, a background image can be deformed according to the position of the video camera, and a synthesized image with no feeling of physical disorder can be easily produced.

According to the aforementioned constitution, point light sources are projected in matrix form onto the background plate 3, the position coordinates of four of the point light sources on the monitor screen are detected from the video signal V1, and a read address for image conversion is produced based on the detected four position coordinates, thereby deforming the background source video signal V2. Therefore, a background image which deforms according to the position of the video camera 2 can be produced with even simpler constitution. In this way, the image synthesizer 20 in which an image of background which is synthesized can be changed naturally in correspondence with movement of a photographing means can be realized with even simpler constitution.

(3) Other Embodiments:

In the aforementioned embodiments, while a description has been made of the case where the point light sources P11 through Pnn in the form of a matrix are projected on the background plate 3 by the projector unit 4, the present invention is not limited to this. Even in the case where light emitting diodes are previously provided in matrix form on the background plate and are turned on and off with a predetermined pattern, similar advantageous effects as the aforementioned case are obtainable. In addition to this, even when point light sources are formed on the background plate by scanning the background plate with a laser beam, similar advantageous effects as the aforementioned case are obtainable. The point here is that if illumination means for forming a light source which becomes the reference of the image synthesizing process with respect to the background plate is provided, similar advantageous effects as the aforementioned case can be obtained.

Also, in the aforementioned embodiments, while a description has been made of the case where the point light sources arranged in matrix form can be identified by turning on and off the light sources with a predetermined pattern, the present invention is not limited to this. Even in the case where the point light sources are identified by changing light intensities with a predetermined pattern, similar advantageous effects as the aforementioned case are obtainable.

In addition, in the aforementioned first embodiment, although a description has been made of the case where distance, inclination, and the like are detected based on the space between point light sources, the present invention is not limited to this but is applicable to the case where a light source image is formed into a bar and distance, inclination, etc., are detected by the length of the bar-shaped light source image instead of the space between point light source images, furthermore the case where a light source image is formed into a rectangle and distance, inclination, etc., are detected by the size of the rectangle, and furthermore the case where distance, inclination, etc., are detected by the number of point light sources contained in an image. That is, the present invention is applicable widely to the case where the position information of a photographing means is detected by a light source image formed on background consisting of a processing object.

Additionally, in the aforementioned embodiments, although a description has been made of the case where an image by computer graphics or an image photographed at another place is inserted at the place of the background plate 3, the present invention is not limited to this. For example, in the case where small utensils, such as desks and boxes, are photographed along with a person, the present invention is also applicable widely to the case where these small utensils are used as processing objects instead of the background plate to synthesize various images.

Industrial Applicability

In broadcasting stations and the like, the invention can be utilized in the case where a synthesized image is produced by inserting another image in a predetermined area of video data.

What is claimed is:

1. An image synthesizer for synthesizing a first video signal supplied from a video camera and a second video signal, comprising:
    illumination means for forming a plurality of light source images onto a background object, wherein said light source images have a hue that is the same as said background object;
    detecting means for detecting a relative location between said video camera and said background object based on said light source images formed onto said background object in response to a movement of said video camera;
    processing means for transforming said second video signal in accordance with said relative location detected by said detecting means; and
    means for synthesizing said first video signal and said second video signal transformed by said processing means.

2. The image synthesizer as set forth in claim 1, wherein said illumination means forms said light source images by point light sources arranged on said background object at predetermined pitches.

3. The image synthesizer as set forth in claim 1, wherein said illumination means comprises projection means for projecting said light source images on said background object.

4. The image synthesizer as set forth in claim 1, wherein said illumination means turns on and off said light source images with a predetermined pattern or changes light intensities of said light source images with a predetermined pattern.

5. The image synthesizer as set forth in claim 1, wherein said detecting means detects an inclination of an optical axis of said video camera with respect to said background object, a distance to a point at which said optical axis crosses said background object, and coordinates of said video camera with respect to a reference point on said background object.

6. The image synthesizer as set forth in claim 1, wherein said background object comprises a background plate installed in background of a subject which is photographed by said video camera.

7. An image synthesizer for detecting an area photographing a processing object area having a predetermined hue from input video data, inserting another image in said area, and then producing a synthesized image, comprising:
    illumination means for forming on said processing object area a plurality of light source images having the same hue as said processing object area, when producing said input video data;
    position detection means for detecting said processing object area from said input video data and detecting positions of four light source images of said plurality of light source images formed on said processing object area which become references;
    image conversion means for three-dimensionally image-converting background source video data which is inserted in said processing object area, based on position information of the light source images detected by said position detection means; and
    synthesis means for synthesizing said background source video data image-converted by said image conversion means with an area of said input video data corresponding to said processing object area.

8. The image synthesizer as set forth in claim 7, wherein said illumination means forms said light source images by point light sources arranged in matrix form on said processing object area.

9. The image synthesizer as set forth in claim 7, wherein said illumination means comprises projection means for projecting said matrix-shaped light source images on said processing object area.

10. The image synthesizer as set forth in claim 7, wherein said illumination means turns on and off said light source images with a predetermined pattern or changes light intensities of said light source images with a predetermined pattern.

11. The image synthesizer as set forth in claim 7, wherein said position detection means computes by interpolation position information of said four light source images which become references, based on position information of other detected light source images, when said four light source images which become references are not present in said input video data.

12. The image synthesizer as set forth in claim 7, wherein said processing object area comprises a background plate installed in background of a subject.

13. The image synthesizer as set forth in claim 7, wherein said image conversion means comprises:
    address arithmetic means for computing a read address for said background source video data given three-dimensional image conversion, based on the position information detected by said position detection means; and
    storage means for producing said background source video data given said three-dimensional image conversion, by reading out said background source video data stored in an interior memory area, based on said read address.

14. The image synthesizer as set forth in claim 13, wherein said address arithmetic means computes a conversion matrix for three-dimensionally image-converting said background source video data, based on said position information of the four light source images detected by said position detection means, and computes said read address, based on an inverse matrix of said conversion matrix.

15. The image synthesizer as set forth in claim 14, wherein said address arithmetic means computes the conversion matrix for three-dimensionally image-converting said background source video data, based on position information on a display coordinate system of said four light source images detected by said position detection means and position information on said processing object area of said four light source images, and computes said read address, based on the inverse matrix of said conversion matrix.

16. The image synthesizer as set forth in claim 15, wherein said conversion matrix is a 3×3 conversion matrix constituted by 8 conversion parameters, as shown in the following equation:

$$T'_{33} = \begin{bmatrix} a_{11}/a_{33} & a_{12}/a_{33} & a_{13}/a_{33} \\ a_{21}/a_{33} & a_{22}/a_{33} & a_{23}/a_{33} \\ a_{31}/a_{33} & a_{32}/a_{33} & 1 \end{bmatrix}$$
$$= \begin{bmatrix} a'_{11} & a'_{12} & a'_{13} \\ a'_{21} & a'_{22} & a'_{23} \\ a'_{31} & a'_{32} & 1 \end{bmatrix}$$

17. The image synthesizer as set forth in claim 16, wherein said address arithmetic means computes said 8 parameters by making use of the following relational equation:

$$[X_i \cdot K_i \quad Y_i \cdot K_i \quad K_i] = [X'_i \quad Y'_i \quad 1] \cdot T'_{33}$$
$$= [X'_i \quad Y'_i \quad 1] \cdot \begin{bmatrix} a'_{11} & a'_{12} & a'_{13} \\ a'_{21} & a'_{22} & a'_{23} \\ a'_{31} & a'_{32} & 1 \end{bmatrix}$$

where i=1 through 4, $(X_i, Y_i)$ represents the position information on the display coordinate system of said four light source images detected by said position detection means, $(X'_i, Y'_i)$ represents the position information on said processing object area of said four light source images, and $K_i$ represents a parameter for a homogeneous coordinate system.

18. An method of synthesizing a first video signal supplied from a video camera and a second video signal, comprising:
   forming a plurality of light source images onto a background object, wherein said light source images have a hue that is the same as said background object;
   detecting a relative location between said video camera and said background object based on said light source images formed onto said background object in response to the movement of said video camera;
   transforming said second video signal in accordance with said relative location detected by said detecting means; and
   synthesizing said first video signal and said second video signal transformed by said processing means.

19. A method of detecting an area photographing a processing object area having a predetermined hue from input video data, inserting another image in said area, and then producing a synthesized image, comprising the steps of:
   forming on said processing object area a plurality of light source images having the same hue as said processing object area, when producing said input video data;
   detecting said processing object area from said input video data and detecting positions of four light source images of said plurality of light source images formed on said processing object area which become references;
   three-dimensionally image-converting background source video data which is inserted in said processing object area, based on position information of said detected light source images; and
   synthesizing said image-converted background source video data with an area of said input video data corresponding to said processing object area.

20. A video synthesizing apparatus for synthesizing a first video signal generated by a video camera and a second video signal, the apparatus comprising:
   means for projecting a plurality of light sources onto a background plate, wherein said light sources have a color that is the same as that of said background plate;
   means for calculating position information which indicates a position of said video camera with respect to a position of said background plate in accordance with said light sources projected onto said background plate in response to a movement of said video camera;
   means for transforming said second video signal in accordance with said position information to generate a transformed video signal; and
   means for inserting said transformed video signal into an area having a predetermined color within said first video signal.

21. A method of synthesizing a first video signal generated by a video camera and a second video signal, comprising the steps of:
   projecting a plurality of light sources onto a background plate, wherein said light sources have a color that is the same as that of said background plate;
   calculating position information which indicates a position of said video camera with respect to a position of said background plate in accordance with said light sources projected onto said background plate in response to a movement of said video camera;
   transforming said second video signal in accordance with said position information to generate a transformed video signal; and
   inserting said transformed video signal into an area having a predetermined color within said first video signal.

22. A video signal processing apparatus for processing a first video signal generated by a video camera and a second video signal, the apparatus comprising:
   means for providing a plurality of light source images onto a background plate, wherein said light source images have a color that is the same as that of said background plate;
   means for calculating a relative position between said video camera and said background plate in accordance with said light source images projected onto said background plate in response to a movement of said video camera;
   means for transforming said second video signal in accordance with said relative position to generate a transformed video signal; and
   means for inserting said transformed video signal into an area having a predetermined color within said first video signal.

23. A method of processing a first video signal generated by a video camera and a second video signal, comprising the steps of:
   providing a plurality of light source images onto a background plate, wherein said light source images have a color that is the same as that of said background plate;
   calculating a relative position between said video camera and said background plate in accordance with said light source images projected onto said background plate in response to a movement of said video camera;
   transforming said second video signal in accordance with said relative position to generate a transformed video signal; and
   inserting said transformed video signal into an area having a predetermined color within said first video signal.

24. A studio system for performing a video synthesize process on a video image produced by a video camera and a graphic image produced by a computer to generate a synthesized image, the system comprising:

means for providing a plurality of light source images onto a background object, wherein said light source images have a color element that is the same as that of said background object;

means for calculating a relative position between said video camera and said background object in accordance with said light source images projected onto said background object;

means for performing a transformation on said graphic image in accordance with said relative position to generate a transformed image; and means for synthesizing said video image and said transformed image by using a chromakey technique to generate said synthesized image.

25. A method of performing a video synthesize process on a video image produced by a video camera and a graphic image produced by a computer to generate a synthesized image, comprising the steps of:

providing a plurality of light source images onto a background object, wherein said light source images have a color element that is the same as that of said background object;

calculating a relative position between said video camera and said background object in accordance with said light source images projected onto said background object;

performing a transformation on said graphic image in accordance with said relative position to generate a transformed image; and synthesizing said video image and said transformed image by using a chromakey technique to generate said synthesized image.

* * * * *